US012688649B1

(12) United States Patent
Borovikov et al.

(10) Patent No.: US 12,688,649 B1
(45) Date of Patent: Jul. 21, 2026

(54) SYSTEM FOR AUTOMATED GENERATION OF FACIAL SHAPES FOR VIRTUAL CHARACTER MODELS

(71) Applicant: Electronic Arts Inc., Redwood City, CA (US)

(72) Inventors: Igor Borovikov, Foster City, CA (US); Karine Levonyan, Belmont, CA (US); Mihai Anghelescu, Coquitlam (CA); Dave Auclair, Winter Park, FL (US); Arjuna Ravikumar, Redwood City, CA (US); Harold Henry Chaput, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 158 days.

(21) Appl. No.: 18/194,524

(22) Filed: Mar. 31, 2023

(51) Int. Cl.
| | |
|---|---|
| *G06T 17/20* | (2006.01) |
| *G06V 10/762* | (2022.01) |
| *G06V 10/764* | (2022.01) |
| *G06V 40/16* | (2022.01) |

(52) U.S. Cl.
CPC ............ *G06T 17/20* (2013.01); *G06V 10/762* (2022.01); *G06V 10/764* (2022.01); *G06V 40/171* (2022.01)

(58) Field of Classification Search
CPC ......... G06T 17/00; G06T 17/20; G06V 10/70; G06V 10/762; G06V 10/764
See application file for complete search history.

(56) References Cited

U.S. PATENT DOCUMENTS

| | | | |
|---|---|---|---|
| 5,274,801 A | 12/1993 | Gordon | |
| 5,548,798 A | 8/1996 | King | |
| 5,982,389 A | 11/1999 | Guenter et al. | |
| 5,999,195 A | 12/1999 | Santangeli | |
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Keller et al., "Learning Extremal Representations with Deep Archetypal Analysis", Dec. 23, 2020, https://doi.org/10.1007/s11263-020-01390-3 (Year: 2020).*

(Continued)

*Primary Examiner* — Kee M Tung
*Assistant Examiner* — Thang Gia Huynh
(74) *Attorney, Agent, or Firm* — Knobbe, Martens, Olson & Bear, LLP

(57) ABSTRACT

Systems and methods are provided for enhanced face shape generation for archetypes of virtual entities based on generative modeling techniques. An example method includes training models based on synthetically generated faces and information associated with an authoring system. The modeling system being trained to reconstruct face shapes for virtual entities based on a latent space embedding of a face identity associated with specific archetypes.

20 Claims, 14 Drawing Sheets

(56) References Cited

U.S. PATENT DOCUMENTS

| | | | |
|---|---|---|---|
| 7,006,090 B2 | 2/2006 | Mittring | |
| 7,403,202 B1 | 7/2008 | Nash | |
| 7,415,152 B2 | 8/2008 | Jiang et al. | |
| 7,944,449 B2 | 5/2011 | Petrovic et al. | |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,406,528 B1 | 3/2013 | Hatwich | |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,648,863 B1 | 2/2014 | Anderson et al. | |
| 8,860,732 B2 | 10/2014 | Popovic et al. | |
| 8,914,251 B2 | 12/2014 | Ohta | |
| 9,001,132 B1 | 4/2015 | Wooley | |
| 9,117,134 B1 | 8/2015 | Geiss et al. | |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,652,879 B2 | 5/2017 | Aguado | |
| 9,741,146 B1 | 8/2017 | Nishimura | |
| 9,786,084 B1* | 10/2017 | Bhat | G06T 15/04 |
| 9,811,716 B2 | 11/2017 | Kim et al. | |
| 9,826,898 B1 | 11/2017 | Jin et al. | |
| 9,858,700 B2 | 1/2018 | Rose et al. | |
| 9,861,898 B2 | 1/2018 | Miura et al. | |
| 9,947,123 B1 | 4/2018 | Green | |
| 9,984,658 B2 | 5/2018 | Bonnier et al. | |
| 9,990,754 B1 | 6/2018 | Waterson et al. | |
| 9,996,940 B1 | 6/2018 | Yamasaki | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,314,477 B1 | 6/2019 | Goodsitt et al. | |
| 10,388,053 B1 | 8/2019 | Carter, Jr. et al. | |
| 10,403,018 B1 | 9/2019 | Worsham | |
| 10,440,443 B2 | 10/2019 | Casey et al. | |
| 10,535,174 B1 | 1/2020 | Rigiroli et al. | |
| 10,726,611 B1 | 7/2020 | Court | |
| 10,733,765 B2 | 8/2020 | Andreev | |
| 10,755,466 B2 | 8/2020 | Chamdani et al. | |
| 10,792,566 B1 | 10/2020 | Schmid | |
| 10,825,220 B1 | 11/2020 | Chang et al. | |
| 10,856,733 B2 | 12/2020 | Anderson et al. | |
| 10,860,838 B1 | 12/2020 | Elahie et al. | |
| 10,878,540 B1 | 12/2020 | Stevens | |
| 10,902,618 B2 | 1/2021 | Payne et al. | |
| 10,986,400 B2 | 4/2021 | Hua et al. | |
| 11,017,560 B1 | 5/2021 | Gafni et al. | |
| 11,341,699 B1* | 5/2022 | Gottlieb | G06N 3/047 |
| 11,403,513 B2 | 8/2022 | Hasenclever et al. | |
| 11,562,523 B1 | 1/2023 | Starke et al. | |
| 11,670,030 B2 | 6/2023 | Shi et al. | |
| 11,830,121 B1 | 11/2023 | Starke et al. | |
| 11,995,754 B2 | 5/2024 | Starke et al. | |
| 12,138,543 B1 | 11/2024 | Starke et al. | |
| 12,205,214 B2 | 1/2025 | Starke et al. | |
| 12,322,015 B2 | 6/2025 | Starke et al. | |
| 2002/0054054 A1 | 5/2002 | Sanbe | |
| 2002/0089504 A1 | 7/2002 | Merrick et al. | |
| 2002/0180739 A1 | 12/2002 | Reynolds et al. | |
| 2003/0038818 A1 | 2/2003 | Tidwell | |
| 2004/0027352 A1 | 2/2004 | Minakuchi | |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |

| | | | |
|---|---|---|---|
| 2006/0217945 A1 | 9/2006 | Leprevost | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0111831 A1 | 5/2008 | Son et al. | |
| 2008/0152218 A1 | 6/2008 | Okada | |
| 2008/0268961 A1 | 10/2008 | Brook | |
| 2008/0273039 A1 | 11/2008 | Girard | |
| 2008/0316202 A1 | 12/2008 | Zhou et al. | |
| 2009/0066700 A1 | 3/2009 | Harding et al. | |
| 2009/0195544 A1 | 8/2009 | Wrinch et al. | |
| 2009/0315839 A1 | 12/2009 | Wilson et al. | |
| 2010/0134501 A1 | 6/2010 | Lowe et al. | |
| 2010/0251185 A1 | 9/2010 | Pattenden | |
| 2010/0277497 A1 | 11/2010 | Dong et al. | |
| 2011/0012903 A1 | 1/2011 | Girard | |
| 2011/0074807 A1 | 3/2011 | Inada et al. | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0187731 A1 | 8/2011 | Tsuchida | |
| 2011/0269540 A1 | 11/2011 | Gillo et al. | |
| 2011/0292055 A1 | 12/2011 | Hodgins et al. | |
| 2012/0029699 A1 | 2/2012 | Jing | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0256928 A1 | 10/2012 | Chiculita | |
| 2012/0275521 A1 | 11/2012 | Cui et al. | |
| 2012/0303343 A1 | 11/2012 | Sugiyama et al. | |
| 2012/0313931 A1 | 12/2012 | Matsuike et al. | |
| 2013/0050464 A1 | 2/2013 | Kang | |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2013/0311885 A1 | 11/2013 | Wang et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2014/0285513 A1 | 9/2014 | Aguado | |
| 2014/0327694 A1 | 11/2014 | Cao et al. | |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0042548 A1 | 2/2016 | Du et al. | |
| 2016/0057499 A1* | 2/2016 | Foerster | H04N 21/251 |
| | | | 705/319 |
| 2016/0071470 A1 | 3/2016 | Kim et al. | |
| 2016/0217723 A1 | 7/2016 | Kim et al. | |
| 2016/0243699 A1 | 8/2016 | Kim | |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0132827 A1 | 5/2017 | Tena et al. | |
| 2017/0221250 A1 | 8/2017 | Aguado | |
| 2017/0301310 A1 | 10/2017 | Bonnier et al. | |
| 2017/0301316 A1 | 10/2017 | Farell | |
| 2018/0068178 A1 | 3/2018 | Theobalt | |
| 2018/0122125 A1 | 5/2018 | Brewster | |
| 2018/0165864 A1 | 6/2018 | Jin et al. | |
| 2018/0211102 A1 | 7/2018 | Alsmadi | |
| 2018/0239526 A1 | 8/2018 | Varanasi et al. | |
| 2018/0293736 A1 | 10/2018 | Rahimi et al. | |
| 2019/0073826 A1 | 3/2019 | Bailey et al. | |
| 2019/0095698 A1* | 3/2019 | Cole | G06N 20/00 |
| 2019/0147224 A1 | 5/2019 | Li et al. | |
| 2019/0228316 A1 | 7/2019 | Felsen et al. | |
| 2019/0295305 A1 | 9/2019 | Yang et al. | |
| 2019/0303658 A1 | 10/2019 | Ando et al. | |

(56)  References Cited

U.S. PATENT DOCUMENTS

| | | | |
|---|---|---|---|
| 2019/0340803 | A1 | 11/2019 | Comer |
| 2019/0392587 | A1 | 12/2019 | Nowozin et al. |
| 2020/0005138 | A1 | 1/2020 | Wedig et al. |
| 2020/0035009 | A1 | 1/2020 | Comer et al. |
| 2020/0035010 | A1 | 1/2020 | Kim |
| 2020/0058148 | A1 | 2/2020 | Blaylock et al. |
| 2020/0222757 | A1 | 7/2020 | Yang et al. |
| 2020/0294299 | A1 | 9/2020 | Rigiroli et al. |
| 2020/0353311 | A1 | 11/2020 | Ganguly et al. |
| 2020/0388065 | A1 | 12/2020 | Miller, IV et al. |
| 2020/0402284 | A1 | 12/2020 | Saragih et al. |
| 2021/0012090 | A1 | 1/2021 | Savchenkov |
| 2021/0019916 | A1 | 1/2021 | Andreev |
| 2021/0166459 | A1 | 6/2021 | Miller, IV |
| 2021/0217184 | A1 | 7/2021 | Payne et al. |
| 2021/0220739 | A1 | 7/2021 | Zinno et al. |
| 2021/0279956 | A1* | 9/2021 | Chandran ............... G06T 17/20 |
| 2021/0292824 | A1 | 9/2021 | Zhang et al. |
| 2021/0308580 | A1 | 10/2021 | Akhoundi |
| 2021/0312689 | A1 | 10/2021 | Akhoundi et al. |
| 2021/0335004 | A1 | 10/2021 | Zohar et al. |
| 2021/0375021 | A1 | 12/2021 | Starke et al. |
| 2021/0383585 | A1 | 12/2021 | Zhao et al. |
| 2021/0406765 | A1 | 12/2021 | Zhang et al. |
| 2022/0035443 | A1 | 2/2022 | Winold et al. |
| 2022/0068000 | A1 | 3/2022 | Herman et al. |
| 2022/0076472 | A1 | 3/2022 | Bocquelet et al. |
| 2022/0101646 | A1 | 3/2022 | McDonald et al. |
| 2022/0148335 | A1 | 5/2022 | Liu |
| 2022/0172431 | A1* | 6/2022 | Abel ...................... G06N 3/045 |
| 2022/0198732 | A1 | 6/2022 | Lin |
| 2022/0215232 | A1 | 7/2022 | Pardeshi et al. |
| 2022/0230376 | A1 | 7/2022 | Rozantsev et al. |
| 2022/0254157 | A1 | 8/2022 | Fu et al. |
| 2022/0292751 | A1 | 9/2022 | Kimura |
| 2022/0319087 | A1 | 10/2022 | Zhang |
| 2022/0379167 | A1 | 12/2022 | Lee |
| 2022/0398796 | A1* | 12/2022 | Phan ...................... G06T 17/00 |
| 2023/0010480 | A1 | 1/2023 | Li et al. |
| 2023/0123820 | A1 | 4/2023 | Wang |
| 2023/0177755 | A1 | 6/2023 | Starke et al. |
| 2023/0186541 | A1 | 6/2023 | Starke et al. |
| 2023/0237724 | A1 | 7/2023 | Starke et al. |
| 2023/0300667 | A1 | 9/2023 | Baek |
| 2023/0306667 | A1 | 9/2023 | Hopkins |
| 2023/0310998 | A1 | 10/2023 | Starke et al. |
| 2023/0326113 | A1 | 10/2023 | Hellge |
| 2023/0334744 | A1 | 10/2023 | Liu |
| 2023/0394735 | A1 | 12/2023 | Shi et al. |
| 2024/0257429 | A1 | 8/2024 | Starke et al. |
| 2024/0307779 | A1 | 9/2024 | Wu |
| 2024/0331293 | A1 | 10/2024 | Borovikov et al. |
| 2025/0099855 | A1 | 3/2025 | Ng et al. |
| 2025/0177857 | A1 | 6/2025 | Akhoundi |
| 2025/0182364 | A1 | 6/2025 | Akhoundi |

FOREIGN PATENT DOCUMENTS

| | | |
|---|---|---|
| CN | 105405380 A | 3/2016 |
| CN | 105825778 A | 8/2016 |
| CN | 110039546 A | 7/2019 |
| JP | 2018-520820 A | 8/2018 |
| JP | 2019-162400 A | 9/2019 |
| WO | WO 2019/184633 A1 | 10/2019 |
| WO | WO 2020/204948 A1 | 10/2020 |

OTHER PUBLICATIONS

Anagnostopoulos et al., "Intelligent modification for the daltonization process", International Conference on Computer Vision Published in 2007 by Applied Computer Science Group of digitized paintings.

Andersson et al., "Virtual Texturing with WebGL," Master's thesis, Chalmers University of Technology, Gothenburg, Sweden (2012).
Avenali, "Color Vision Deficiency and Video Games", The Savannah College of Art and Design, Mar. 2013.
Badlani et al., "A Novel Technique for Modification of Images for Deuteranopic Viewers", May 2016.
U.S. Appl. No. 18/194,524Tschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Blanz et al., "A morphable model for the synthesis of 3D faces," In Proceedings of the 26th annual conference on Computer graphics and interactive techniques Jul. 1, 1999 (pp. 187-194). ACM Press/Addison-Wesley Publishing Co.
Blanz et al., "Reanimating Faces in Images and Video" Sep. 2003, vol. 22, No. 3, pp. 641-650, 10 pages.
Chao et al., "A Simple Geometric Model for Elastic Deformations", 2010, 6 pgs.
Clavet, "Motion matching and the road to next-gen animation," In Proc. of GDC. 2016 (Year: 2016).
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Dudash, "Skinned instancing." NVidia white paper(2007).
Fikkkan, "Incremental loading of terrain textures," MS thesis. Institutt for datateknikk og informasjonsvitenskap, 2013.
Geijtenbeek et al., "Interactive Character Animation using Simulated Physics", Games and Virtual Worlds, Utrecht University, The Netherlands, The Eurographics Association 2011, 23 pgs.
Geijtenbeek et al. Interactive Character Animation Using Simulated Physics: a State-of-the-Art Review), Computer Graphics forum, vol. 31, 2012 (Year: 2012), 24 pgs.
Georgii et al., "Corotated Finite Elements Made Fast and Stable", Workshop in Virtual Reality Interaction and Physical Simulation VRIPHYS (2008), 9 pgs.
Habbie et al., "A Recurrent Variational Autoencoder for Human Motion Synthesis", 2017, in 12 pages.
Halder et al., "Image Color Transformation for Deuteranopia Patients using Daltonization", IOSR Journal of VLSI and Signal Processing (IOSR-JVSP) vol. 5: Issue 5: Ver. I (Sep.-Oct. 2015): pp. 15-20.
Han et al., "On-line Real-time Physics-based Predictive Motion Control with Balance Recovery," Eurographics, vol. 33(2), 2014, 10 pages.
Hernandez et al., "Simulating and visualizing real-time crowds on GPU clusters." Computacion y Sistemas 18.4 (2014): 651-664.
Holden et al., "Phase-functioned neural networks for character control," ACM Transactions on Graphics (TOG). Jul. 20, 2017;36(4): 1-3. (Year: 2017).
Hu et al., "face recognition by an albedo based 3D morphable model," In Biometrics (IJCB), 2014 IEEE International Joint Conference on Sep. 29, 2014 (pp. 1-8). IEEE.
Hu, "Face Analysis using 3D Morphable Models," Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—a Method to Simulate Inextensible Clothing in Computer Games", Eurographics/ACM SIGGRAPH Symposium on Computer Animation (2012), 6 pgs.

(56) References Cited

OTHER PUBLICATIONS

Klein, "Rendering Textures up Close in a 3D Environment Using Adaptive Micro-Texturing," Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Liu Shikai, "Method, Device, Equipment and Storage for generating walking animation of Virtual Character", English Translation of CN 202111374361.9, Nov. 19, 2021 (Year: 2021).

Macklin et al., "Position Based Fluids", to appear in ACM TOG 32(4), 2013, 5 pgs.

Mcadams et al., "Efficient Elasticity for Character Skinning with Contact and Collisions", 2011, 11 pgs.

Mcdonnell et al., "Clone attack! perception of crowd variety." ACM Transactions on Graphics (TOG). vol. 27. No. 3. ACM, 2008.

Min et al., "Interative Generation of Human Animation with Deformable Motion Models" (Year: 2009).

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse et al., "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

Pelechano et al., "Controlling individual agents in high-density crowd simulation." Proceedings of the 2007 ACM SIGGRAPH/ Eurographics symposium on Computer animation. Eurographics Association, 2007. APA.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, "Reducing memory requirements for diverse animated crowds." Proceedings of Motion on Games. ACM, 2013.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.

Sifakis, Eftychios D., "FEM Simulations of 3D Deformable Solids: a Practioner's Guide to Theory, Discretization and Model Reduction. Part One: the Classical FEM Method and Discretization Methodology", SIGGRAPH 2012 Course, Version 1.0 [Jul. 10, 2012], 50 pgs.

Starke et al., "Local motion phases for learning multi-contact character movements." ACM Transactions on Graphics (TOG). Jul. 8, 2020;39(4):54-1 (Year: 2020).

Stomakhin et al., "Energetically Consistent Invertible Elasticity", Eurographics/ACM SIGRAPH Symposium on Computer Animation (2012), 9 pgs.

Thalmann et al., "Crowd rendering." Crowd Simulation. Springer London, 2013. 195-227.

Thalmann et al., "Modeling of Populations." Crowd Simulation. Springer London, 2013. 31-80.

Treuille, A. et al., "Near-optimal Character Animation with Continuous Control", University of Washington, 2007, 7 pgs.

Ulicny et al., "Crowd simulation for interactive virtual environments and VR training systems." Computer Animation and Simulation 2001 (2001): 163-170.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Vigueras et al. "A distributed visualization system for crowd simulations." Integrated Computer-Aided Engineering 18.4 (2011): 349-363.

Wu et al., "Goal-Directed Stepping with Momentum Control," Eurographics/ ACM SIGGRAPH Symposium on Computer Animation, 2010, 6 pages.

Yamane et al.," Natural Motion Animation through Constraining and Deconstraining at Will" (Year: 2003).

Zhang et al., "Mode-adaptive neural networks for quadruped motion control. ACM Transactions on Graphics (TOG)." Jul. 30, 2018;37(4): 1-1. (Year: 2018).

Zhu et al. "Kinematic Motion Analysis with Volumetric Motion Capture", International Conference Information Visualisation (IV) (Year 2022).

* cited by examiner

300

302

GENERATE SYNTHETIC FACE
MODELS

304

RECEIVE AUTHORING
PARAMETERS FOR MODELS

306

DETERMINE LATENT FEATURE
REPRESENTATION OF MODELS

308

GENERATE MAPPING OF
LATENT REPRESENTATION TO
AUTHORING PARAMETERS

310

OUTPUT DECODING ENGINE

400

402

RECEIVE FACE MODEL IDENTITY REQUEST

404

GENERATE LATENT EMBEDDING FOR REQUESTED FACE MODEL

406

GENERATE AUTHORING PARAMETERS BASED ON LATENT EMBEDDING

408

GENERATE FACE MODEL BASED ON AUTHORING PARAMETERS

410

GENERATE ADDITIONAL FACE CHARACTERISTICS

412

OUTPUT FACE MODEL

Archetype Images 112

Identity Engine 110

Latent Feature Representation 114

Model Generation System 160

Archetype Cluster Model 118

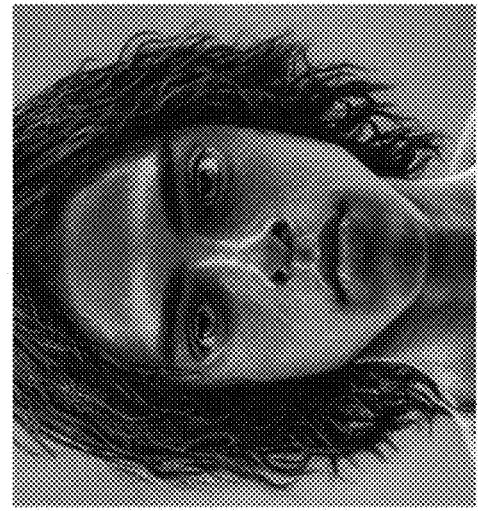
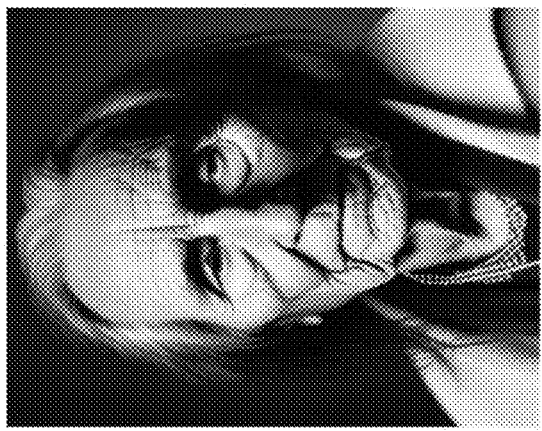
FIG. 6B

800

802
RECEIVE IMAGES OF FACES
FOR TARGET ARCHETYPE

804
DETERMINE LATENT FEATURE
REPRESENTATION OF IMAGES OF
TARGET ARCHETYPE

806
DETERMINE LATENT SPACE
CLUSTER BASED ON TARGET
ARCHETYPE

808
GENERATE MODEL OF LATENT
SPACE FOR TARGET
ARCHETYPE(S)

810
OUTPUT ARCHETYPE
CLUSTER MODEL

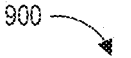

900

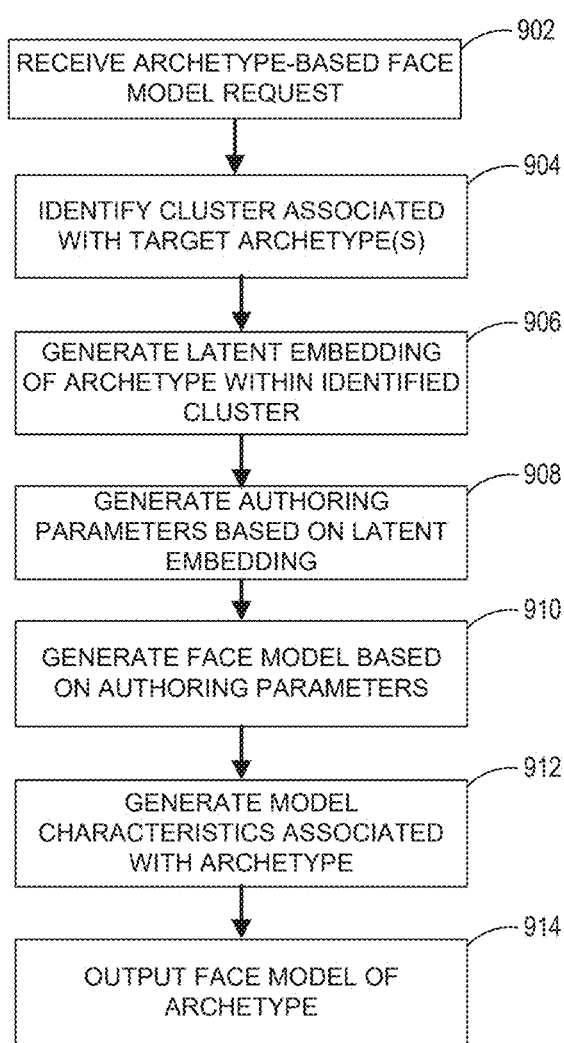

902

RECEIVE ARCHETYPE-BASED FACE MODEL REQUEST

904

IDENTIFY CLUSTER ASSOCIATED WITH TARGET ARCHETYPE(S)

906

GENERATE LATENT EMBEDDING OF ARCHETYPE WITHIN IDENTIFIED CLUSTER

908

GENERATE AUTHORING PARAMETERS BASED ON LATENT EMBEDDING

910

GENERATE FACE MODEL BASED ON AUTHORING PARAMETERS

912

GENERATE MODEL CHARACTERISTICS ASSOCIATED WITH ARCHETYPE

914

OUTPUT FACE MODEL OF ARCHETYPE

FIG. 9

SYSTEM FOR AUTOMATED GENERATION OF FACIAL SHAPES FOR VIRTUAL CHARACTER MODELS

TECHNICAL FIELD

The present disclosure relates to systems and techniques for generation of facial shapes for virtual character models. More specifically, this disclosure relates to machine learning techniques for character model generation of human faces.

BACKGROUND

Electronic games are increasingly becoming more realistic due to an increase in available processing resources. Populating virtual worlds with many realistic-looking characters is far from trivial yet in high demand. The efficient generation of random realistic human heads is motivated by the need for a substantial number of background and non-player characters without hand-authoring them. Examples include random encounters in role-playing games, characters of a background crowd in cinematics, a virtual audience of stadiums, secondary team players in sports games, and a virtual audience in the virtual reality (VR) events like classes, concerts, and alike. Randomly generated player avatars also fall into the category of pseudo-random characters. All these have to come in large numbers at a low production cost, perhaps, even on-the-fly during run-time. A potential shortcut is to use random photographs of real people and reproduce their likeness via reconstruction and 3D shape estimation. While face generation from real references could technically work for randomization, it can be problematic due to privacy and licensing concerns around facial datasets.

SUMMARY OF CERTAIN EMBODIMENTS

In some aspects, the techniques described herein relate to a computer-implemented method including: receiving a request to generate a first virtual face model associated with at least one archetype class; accessing an archetype cluster model trained based on a plurality of human faces associated with individual archetypes, each human face being defined based on at least one archetype associated with a plurality of facial features, the archetype cluster model trained to identify an archetype cluster within latent space associated with one or more archetypes, and generate a latent feature representation of individual human faces within an identified cluster, wherein the latent feature representation is associated with an identity of the virtual human face; identifying, using the archetype cluster model, at least one archetype cluster within latent space associated with the at least one archetype class; generating, using the archetype cluster model, a latent feature representation of the first virtual face based at least in part on the at least one archetype cluster, wherein the latent feature representation is associated with a first identity; accessing a decoding engine, the decoding engine trained to reconstruct authoring parameters for an authoring engine based on a latent feature representation of a human face; generating, using the decoding engine, authoring parameters based at least in part on the latent feature representation of the first virtual face; and generating, using the authoring engine, a virtual face model of the at least one virtual face based at least in part on the authoring parameters, wherein the virtual face model has the first identity, wherein the virtual face model is mesh model.

In some aspects, the techniques described herein relate to a computer-implemented method, wherein the latent feature representation is pseudo-randomly generated based on the latent space associated with the at least one archetype cluster of the at least one archetype class.

In some aspects, the techniques described herein relate to a computer-implemented method, wherein the request further includes requests to generate a plurality of virtual face models within at least one archetype class, and the latent feature representation of individual virtual faces is generated for each of the plurality of requested virtual face models.

In some aspects, the techniques described herein relate to a computer-implemented method, wherein each of the plurality of virtual face identities is pseudo-randomly generated and each of the virtual face identities is generated from the latent space latent space associated with the at least one cluster of the at least one archetype class, wherein each latent feature representation is separated from other latent feature representations by a defined threshold value.

In some aspects, the techniques described herein relate to a computer-implemented method further including generating at least one facial characteristic associated with the mesh of the virtual face model, wherein the at least one facial characteristic is associated with the at least one archetype class.

In some aspects, the techniques described herein relate to a computer-implemented method, wherein the at least one facial characteristic includes at least one of skin texture, eye texture, hair mesh, or hair texture.

In some aspects, the techniques described herein relate to a computer-implemented method, wherein the latent feature representation is a vector have defined set of values.

In some aspects, the techniques described herein relate to a computer-implemented method, wherein each archetype cluster is associated with at least one archetype, and, for each archetype cluster, each value of the set of values of the latent feature representation is associated with a range of values within the latent space.

In some aspects, the techniques described herein relate to a computer-implemented method, wherein the virtual face model is generated based on weights associated with a plurality of blendshapes that the define a shape of the mesh model.

In some aspects, the techniques described herein relate to a computer-implemented method, wherein the authoring parameters define weights associated with the plurality of blendshapes.

In some aspects, the techniques described herein relate to a computer-implemented method, wherein the archetype cluster model is a machine learning model generated using a deep neural network.

In some aspects, the techniques described herein relate to non-transitory computer storage media storing instructions that when executed by a system of one or more computers, cause the one or more computers to perform operations including: receiving a request to generate a first virtual face model associated with at least one archetype class; accessing an archetype cluster model trained based on a plurality of human faces associated with individual archetypes, each human face being defined based on at least one archetype associated with a plurality of facial features, the archetype cluster model trained to identify an archetype cluster within latent space associated with one or more archetypes, and generate a latent feature representation of individual human faces within an identified cluster, wherein the latent feature representation is associated with an identity of the virtual human face; identifying, using the archetype cluster model, at least one archetype cluster within latent space associated with the at least one archetype class; generating, using the archetype cluster model, a latent feature representation of the first virtual face based at least in part on the at least one archetype cluster, wherein the latent feature representation is associated with a first identity; accessing a decoding engine, the decoding engine trained to reconstruct authoring parameters for an authoring engine based on a latent feature representation of a human face; generating, using the decoding engine, authoring parameters based at least in part on the latent feature representation of the first virtual face; and generating, using the authoring engine, a virtual face model of the at least one virtual face based at least in part on the authoring parameters, wherein the virtual face model has the first identity, wherein the virtual face model is mesh model.

In some aspects, the techniques described herein relate to a non-transitory computer storage media, wherein the latent feature representation is pseudo-randomly generated based on the latent space associated with the at least one archetype cluster of the at least one archetype class.

In some aspects, the techniques described herein relate to a non-transitory computer storage media, wherein the request further includes requests to generate a plurality of virtual face models within at least one archetype class, and the latent feature representation of individual virtual faces is generated for each of the plurality of requested virtual face models.

In some aspects, the techniques described herein relate to a non-transitory computer storage media, wherein each of the plurality of virtual face identities is pseudo-randomly generated and each of the virtual face identities is generated from the latent space latent space associated with the at least one cluster of the at least one archetype class, wherein each latent feature representation is separated from other latent feature representations by a defined threshold value.

In some aspects, the techniques described herein relate to a non-transitory computer storage media further including generating at least one facial characteristic associated with the mesh of the virtual face model, wherein the at least one facial characteristic is associated with the at least one archetype class.

In some aspects, the techniques described herein relate to a non-transitory computer storage media, wherein the at least one facial characteristic includes at least one of skin texture, eye texture, hair mesh, or hair texture.

In some aspects, the techniques described herein relate to a non-transitory computer storage media, wherein the latent feature representation is a vector have defined set of values.

In some aspects, the techniques described herein relate to a non-transitory computer storage media, wherein each archetype cluster is associated with at least one archetype, and, for each archetype cluster, each value of the set of values of the latent feature representation is associated with a range of values within the latent space.

In some aspects, the techniques described herein relate to a system including one or more computers and non-transitory computer storage media storing instructions that when executed by the one or more computers, cause the one or more computers to perform operations including: receiving a request to generate a first virtual face model associated with at least one archetype class; accessing an archetype cluster model trained based on a plurality of human faces associated with individual archetypes, each human face being defined based on at least one archetype associated with a plurality of facial features, the archetype cluster model trained to identify an archetype cluster within latent space associated with one or more archetypes, and generate a latent feature representation of individual human faces within an identified cluster, wherein the latent feature representation is associated with an identity of the virtual human face; identifying, using the archetype cluster model, at least one archetype cluster within latent space associated with the at least one archetype class; generating, using the archetype cluster model, a latent feature representation of the first virtual face based at least in part on the at least one archetype cluster, wherein the latent feature representation is associated with a first identity; accessing a decoding engine, the decoding engine trained to reconstruct authoring parameters for an authoring engine based on a latent feature representation of a human face; generating, using the decoding engine, authoring parameters based at least in part on the latent feature representation of the first virtual face; and generating, using the authoring engine, a virtual face model of the at least one virtual face based at least in part on the authoring parameters, wherein the virtual face model has the first identity, wherein the virtual face model is mesh model.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 6B illustrates examples of synthetic training data generated using generative services.

FIG. 9 illustrates a flowchart of an example process for generating archetype-based face models based on latent feature representations associated with defined archetypes.

Like reference numbers and designations in the various drawings indicate like elements.

DETAILED DESCRIPTION

Overview

Figure 1A:
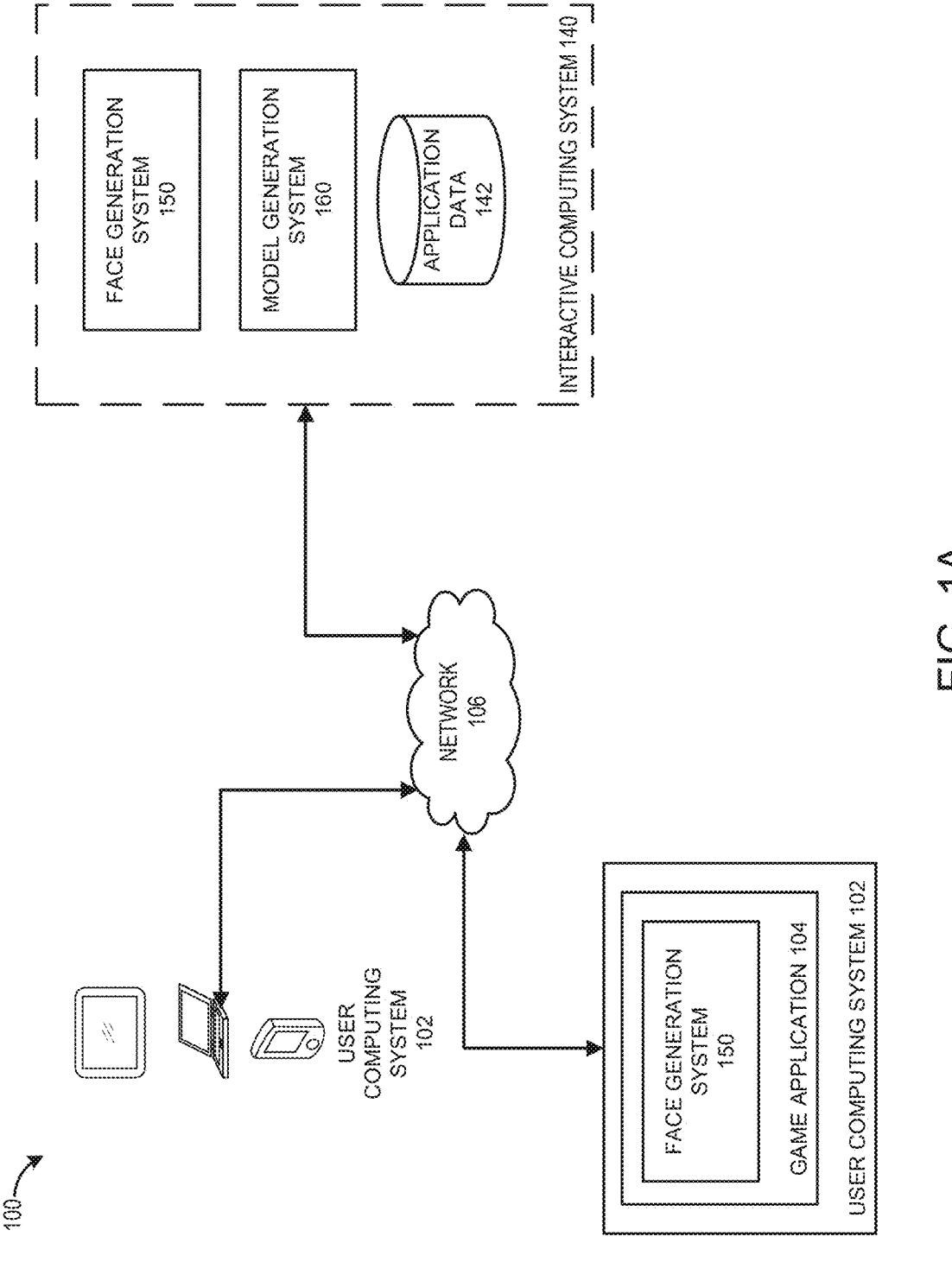
FIG. 1A illustrates a block diagram of a computing environment for implementing a face generation system.

This specification describes, among other things, technical improvements with respect to generation of face models for virtual characters configured for use in electronic video games. As will be described a system described herein (e.g., the face generation system) may generate realistic face models, including meshes and textures, based on latent space representations of an identity engine. Advantageously, the system may allow for substantially automated face model generation. While electronic games are described, it may be appreciated that the techniques described herein may be applied generally to generation of face models and features of character models. For example, animated content (e.g., TV shows, movies) may employ the techniques described herein.

The face generation system can utilize machine learning models to generate a face models using a face model authoring system based on identity information generated by an identity encoding system. The face models may be generated based on a request providing identity information to the identity encoding system or requesting that the identity encoding system automatically generate identity information. The output of which can be provided to an authoring system to output a face model.

The system may use machine learning techniques, such as an autoencoder, to reduce a dimensionality associated with the input features. In some embodiments, principle component analysis may be used as a dimensionality reduction technique. With respect to an autoencoder, the system may learn a latent feature space of a lower-dimension than the input features. With respect to an autoencoder, an encoder may learn to map input features of expressions to the latent feature space. A decoder may then learn to map the latent feature space to an output defining features of the face models. Thus, the autoencoder may be trained to generate an output face model based on a latent feature representation. The learned latent feature space may represent a bottleneck, which causes each latent variable in the latent feature space to encode complex information associated with face models. In this way, the autoencoder may learn a latent feature space representing realistic face models.

The training process for generating a decoder engine for an authoring engine can include generating synthetic training data by the authoring engine. The synthetic training data can be face models generated by the authoring engine. The training of the decoder engine can generate a mapping of a latent representation to another linear model, such as the authoring parameters of a linear modeling space for a blendshape-based model, to generate face shapes consistent with the domain used for training the autoencoder. The trained decoder engine can generate authoring parameters corresponding to the identities generated within the latent space of the identity engine. These authoring parameters can then be used by the authoring engine to automatically generate synthetic face shapes that are representative of realistic human faces.

In some embodiments, the techniques described herein can be used during the development process of the electronic game. In some embodiments, the techniques described herein may be performed during in-game gameplay of an electronic game. For example, the game may need to populate a location within the game environment, such as a stadium, with thousands of realistic face models. The electronic game may automatically generate realistic and distinct face models for the identified game environment.

In some embodiments, the user may provide an image of a face to be used for an in-game character to be used within the electronic game. For example, the face generation system can generate a face model that is a realistic representation of the user for use as an in-game character within the electronic game.

Example Networked Computing Environment

FIG. 1A illustrates an embodiment of a computing environment 100 for implementing a face generation system 150. The environment 100 includes a network 106, a plurality of user computing systems 102 and an interactive computing system 140, which includes face generation system 150, model generation system 160, and application data store 142. The user computing system(s) 102 may communicate via a network 106 with the Although only one network 106 is illustrated, multiple distinct and/or distributed networks 106 may exist. The network 106 can include any type of communication network. For example, the network 106 can include one or more of a wide area network (WAN), a local area network (LAN), a cellular network, an ad hoc network, a satellite network, a wired network, a wireless network, and so forth. In some embodiments, the network 106 can include the Internet.

User Computing System

Figure 10:
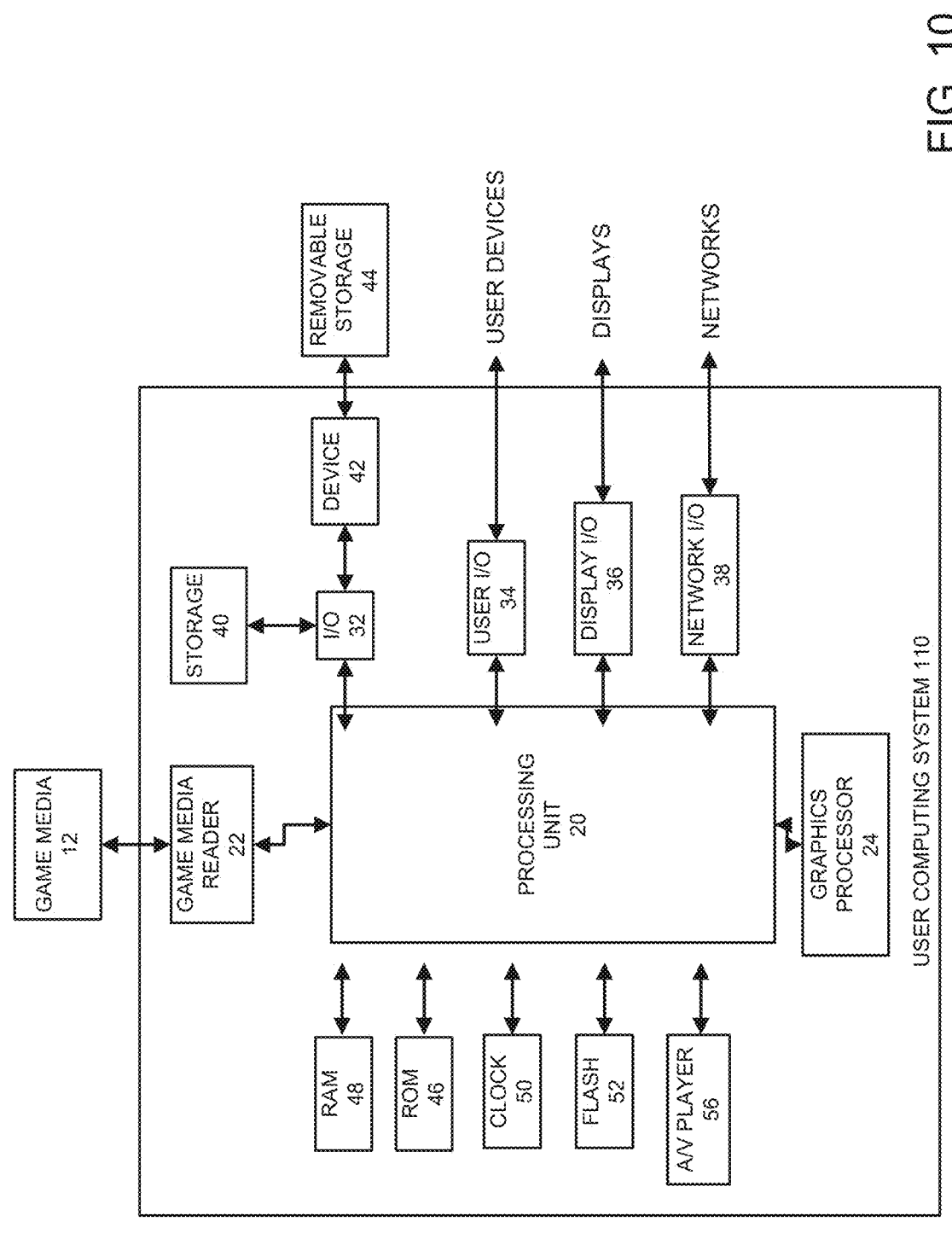
FIG. 10 illustrates an embodiment of computing device according to the present disclosure.

The user computing system 102 includes computing resources and an application data store 142. The user computing system 102 may have varied local computing resources such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 10.

Game Application

The user computing system 102 can execute a game application based on software code stored at least in part in the application data store. The game application may also be referred to as a videogame, a game, game code and/or a game program. A game application should be understood to include software code that a computing device 102 can use to provide a game for a user to play. A game application may comprise software code that informs a computing device 102 of processor instructions to execute but may also include data used in the playing of the game, such as data relating to constants, images, route information, and other data structures. In the illustrated embodiment, the game application includes a game engine, game data, and game state information.

In some embodiments, the user computing system 102 is capable of executing a game application, which may be stored and/or executed in a distributed environment. For example, the user computing system 102 may execute a portion of a game and a network-based computing system, may execute another portion of the game. For example, the game may be an online multiplayer game that includes a client portion executed by the user computing system 102 and a server portion executed by the interactive computing system 140.

The game engine can be configured to execute aspects of the operation of the game application within the user computing system 102. Execution of aspects of gameplay within a game application can be based, at least in part, on the user input received, the game data, and game state information. The game data can include game rules, animation data, environmental settings, constraints, skeleton models, route information, and/or other game application information.

The game engine can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine can receive the user inputs and determine in-game events, such as actions, jumps, runs, throws, attacks and other events appropriate for the game application. During runtime operation, the game engine can read in game data and game state information to determine the appropriate in-game events. The game engine can include controllers for virtual objects within the game application that can control actions performed by the virtual object during runtime of the game application.

In one example, after the game engine determines the character events, the character events can be conveyed to a character controller that can determine the action state of the character and appropriate motions the character should make in response to the events. The physics engine can determine new poses for the characters based on the action state and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can be repeated for rendering each frame during execution of the game application. Though the process has been described in the context of a character, the process can be applied to any process for processing events and rendering the output for display to a user.

The game data can include game rules, prerecorded motion capture poses/paths, environmental settings, environmental objects, constraints, skeleton models, route information, and/or other game application information. At least a portion of the game data can be stored in the application data store 142. In some embodiments, a portion of the game data may be received and/or stored remotely, such as in the source asset data store. In such embodiments, game data may be received during runtime of the game application.

During runtime, the game application can store game state information, which can include a game state, character states, environment states, scene object storage, route information and/or other information associated with a runtime state of the game application. For example, the game state information can identify the state of the game application at a specific point in time, such as a character position, character orientation, character action, game level attributes, and other information contributing to a state of the game application. The game state information can include dynamic state information that continually changes, such as character movement positions, and static state information, such as positions of goal posts on a field.

Interactive Computing System

The interactive computing system 140 may include application host systems and an application data store 142. In some embodiments, the interactive computing system 140 can include one or more computing devices, such as servers and databases that may host and/or execute a portion of one or more instances of the game application. In some embodiments, the application host systems can include one or more computing devices, such as servers and databases that may host and/or execute a portion of one or more instances of the game application. In certain embodiments, instead of or in addition to executing a portion of the game application, the application host systems may execute another application, which may complement and/or interact with the game application during execution of an instance of the game application.

The interactive computing system 140 may enable multiple users or computing systems to access a portion of the game application executed or hosted by the interactive computing system 140. The interactive computing system 140 can have one or more game servers that are configured to host online video games. For example, the interactive computing system 140 may have one or more game servers that are configured to host an instanced (e.g., a first person shooter multiplayer match) or a persistent virtual environment (e.g., a multiplayer online roll playing game). The virtual environment may enable one or more users to interact with the environment and with each other in a synchronous and/or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 140 may execute a hosting system for executing various aspects of a game environment. For example, in one embodiment, the game application may be a competitive game, such as a first person shooter or sports game, and the interactive computing system 140 can provide a dedicated hosting service (such as, through the game servers) for hosting multiplayer game instances or facilitate the creation of game instances hosted by user computing systems 102.

Face Generation System

Figures 5A, 5B:
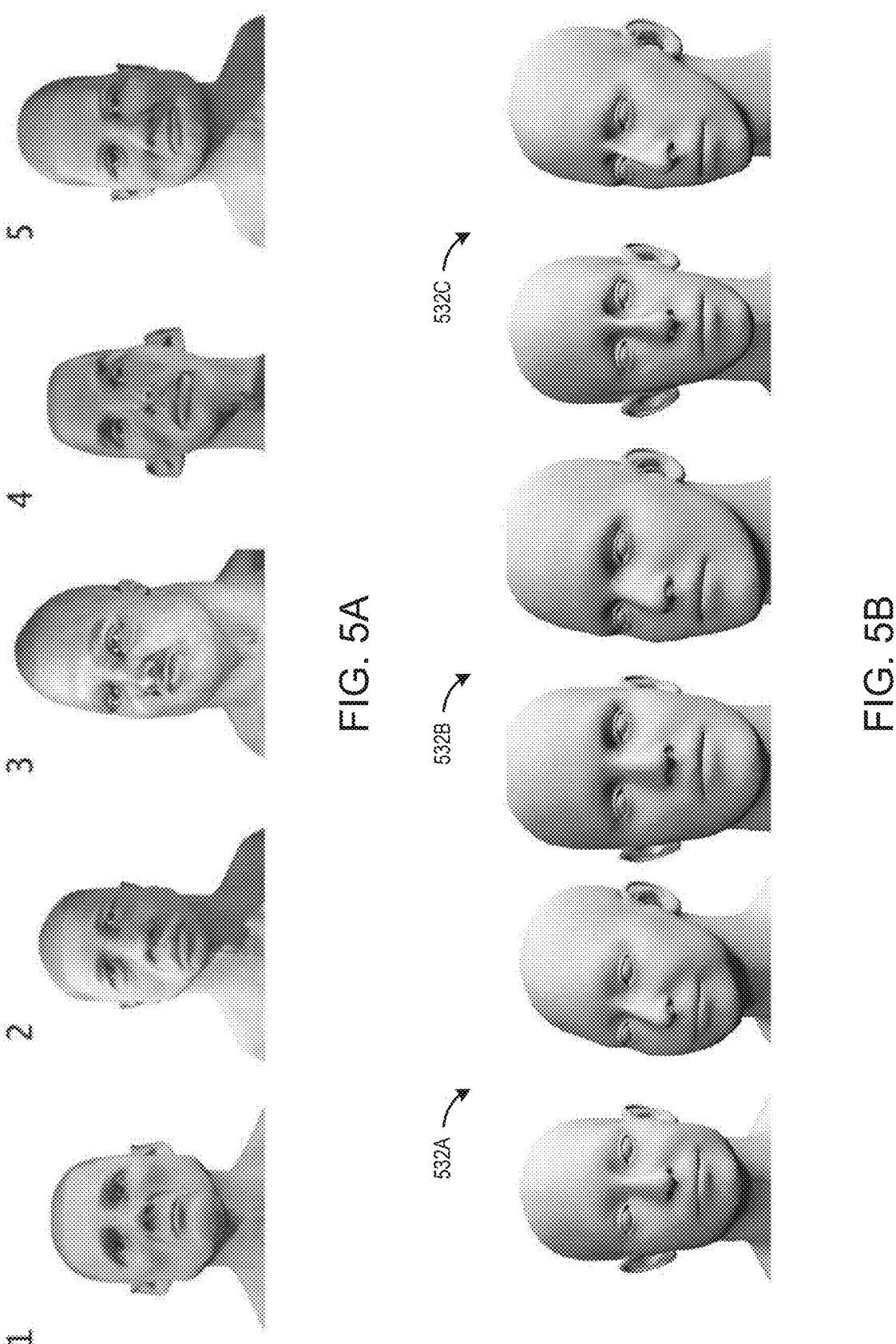
FIG. 5A illustrates examples of face shapes generated by an authoring engine.
FIG. 5B illustrates examples of face shapes generated by an authoring engine using the face generation system.

The face generation system 150 can utilize machine learning models to generate a face models (such as illustrated in FIG. 5B) using a face model authoring system, such as authoring engine 130, based on identity information generated by an identity encoding system, such as identity engine 110. The face generation system 150 may, in some embodiments, be a system of one or more computers, one or more virtual machines executing on a system of one or more computers, and so on. In some embodiments, the face generation system 150 may be implemented as a module, or software (e.g., an application), which may execute on a user device (e.g., a laptop, tablet, console gaming system, and so on). The models 532A-532C illustrated in FIG. 5B are an example output of face models being generated by the face generation system 150. While three distinct models are illustrated, it may be appreciated that any number of face models may be generated by the face generation system 150. The face models may be generated based on a request providing identity information to the identity encoding system or requesting that the identity encoding system automatically generate identity information. The output of which can be provided to an authoring system to output a face model. In some embodiments, the face generation system 150 may be executed by the user computing system 102 and/or the interactive computing system 140 during runtime of the game application 104 to generate face models for one or more virtual characters within a virtual environment. The details of operation and training of the face generation system 150 will be further described herein.

Model Generation System

The model generation system 160 can use one or more machine learning algorithms to generate one or more generative models or parameter functions. One or more of these prediction models may be used to determine an expected value or occurrence based on a set of inputs. The machine learning algorithms can be configured to adaptively develop and update the models over time based on new input received by the model generation system 160. For example, the models can be regenerated on a periodic basis as new information is available to help keep the models accurate over time. The model generation system 160 is described in more detail herein.

Application Data Store

The interactive computing system 140 can include one or more application data stores 142 that are configured to store information associated with one or more game applications, the face generation system 150, and/or the model generation system 160. For example, the application data stores 142 can store model data generated by the model generation system. The interactive computing system 140 can include one or more data stores 142 that are configured to store information associated with game application hosted by the interactive computing system 140. The application data stores 142 can include information associated with the game application that is generated by the face generation system 150. For example, the game data stores 142 can include face shapes generated by the face generation system 150 that are used during runtime of the game application.

Embodiments of Model Training for the Face Generation System

Figure 1B:
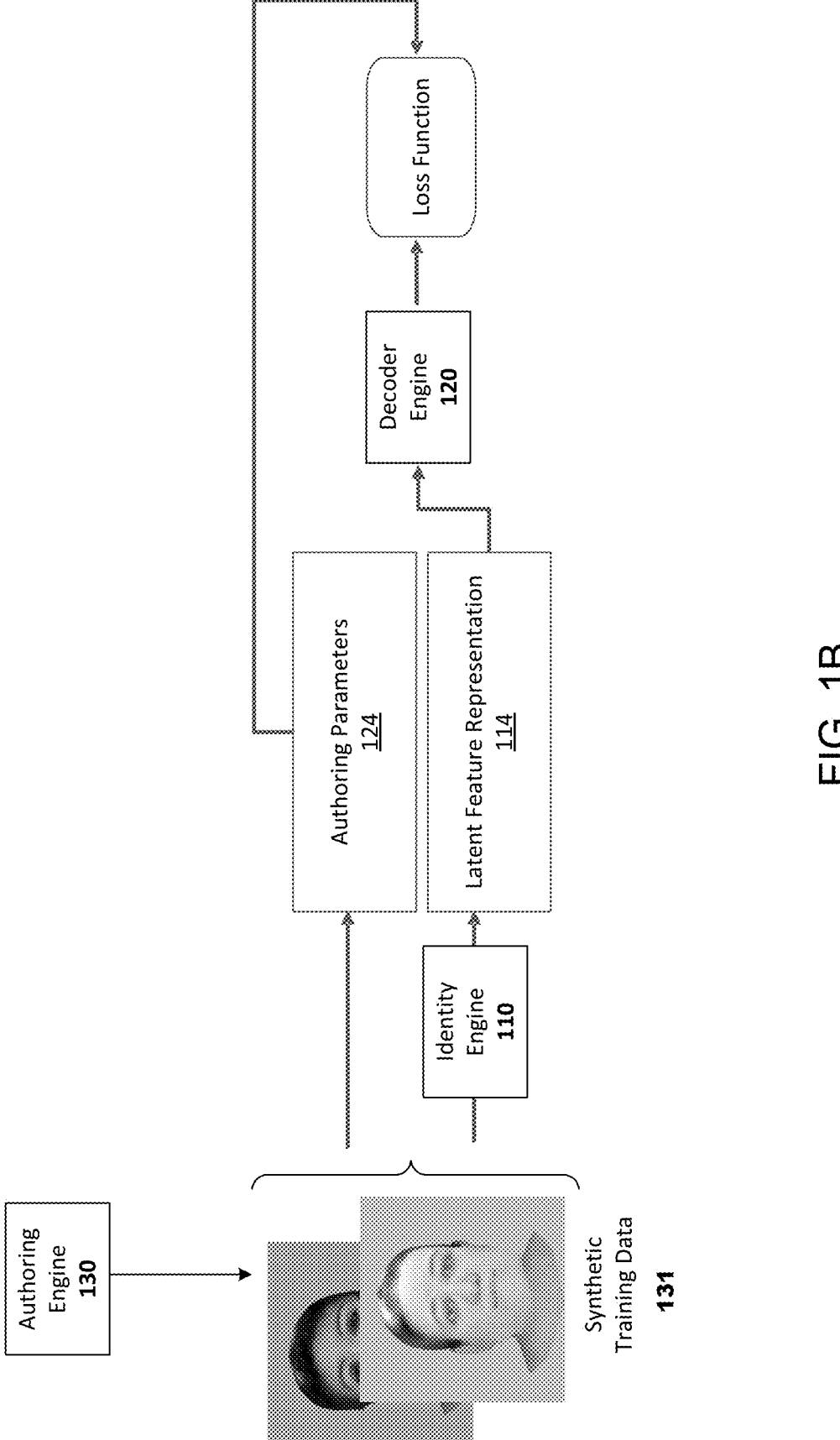
FIG. 1B illustrates an example of a process of training aspects of the face generation system.

FIG. 1B illustrates an example of a process of training aspects of the face generation system 150. In this example, the face generation system 150 may implemented as an autoencoder. As illustrated, the autoencoder may include the identity engine 110 that generates identity information, such as a latent feature representation 114. The decoder engine 120 is trained to generate authoring parameters 124 based on the latent feature representation 114. The components and training of the face generation system 150 are further described below.

Authoring Engine

The authoring engine 130 can be configured to generate face models based on a plurality of authoring parameters 124. The face models can be parametric face models. The parametric facial modeling system captures the face shape via weights applied to the blendshapes or bone deformations used for modeling the geometry of the head. Design of blendshapes can rely on anatomical knowledge, manually modeled heads, scans, 4D animation capture, or a combination of these. The goal of a parametric face model is to provide a sufficiently wide expressive range to represent a large variety of heads.

Due to the range of expressive power and independence of parameters, a parametric model may produce unrealistic grotesque or cartoonish heads when used with extreme values of the parameters. Characters generated with extreme parameter values may also look technically broken when the underlying mesh self-penetrates, folds on itself or creates unnatural cusps, such as illustrated by the face shapes 1-5 in FIG. 5A. However, artificially limiting the values may lead to a repetitive synthetic appearance breaking the fiction of the virtual world.

The parametric representation of 3D shape assumes the presence of the proper construction basis. In some embodiments, a blendshape model can be used. A blendshape model generates a facial pose as a linear combination of a number of facial expressions. By varying the weights of the linear combination, a range of facial expressions can be expressed with little computation. The set of shapes can be extended as desired to refine the range of expressions that the character can produce. Blendshapes provide linear face models in which the individual basis vectors are not orthogonal but instead represent individual facial expressions. The individual basis vectors can be referred to blendshapes and the corresponding weights can be referred to as sliders. The blendshapes are versatile and can describe static neutral shapes and animations like dynamic facial expressions. The implementation details may vary widely utilizing explicit mesh morphs, bone deltas, magnets, etc. A feature of the blendshape model is its linearity: the space of general deformations is decomposed via the vectors in multidimensional space to represent a particular target shape. The weights of the blendshapes contributing to the target shape (as in decomposing a vector into a basis) can accurately define the geometry within a specific domain.

The linearity of the parametric model can help to generate plausible, realistic parametric heads. Another important feature is the basis vector's explicit visual or anatomical semantics. The engineered semantics can be local and not have implicit knowledge related to the correlation of the features. The authoring parameters 124 generated by the decoder engine 120 can identify the blendshape weights that can be used by the authoring engine 130 to generate a face model 132. The face model can be a mesh defining the shape of the face based on the weights of the blendshapes.

The authoring engine 130 can additionally be configured to generate other facial characteristics, such as skin textures, eye textures, hair style, facial effects (e.g., car rings, scars, freckles, etc.) that are used to complete a facial model.

Identity Engine

Figure 1C:
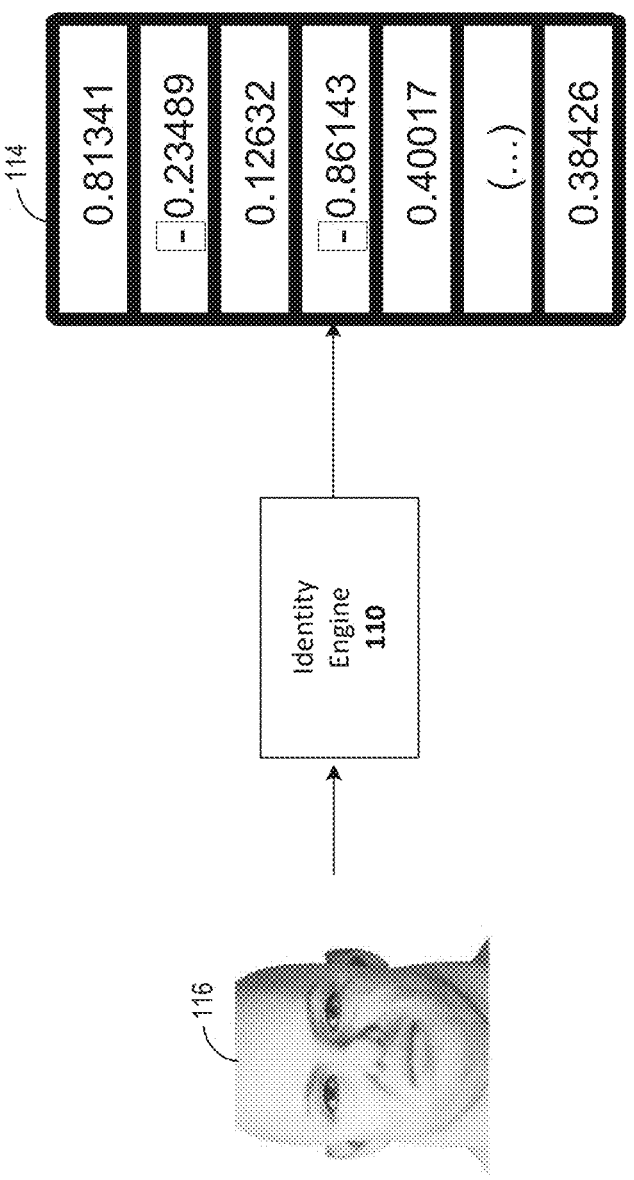
FIG. 1C illustrates an example embodiment of aspects of an identity engine.

The identity engine 110 can be described with further reference to FIG. 1C. The identity engine 110 can use machine learning techniques to provide a facial recognition system to generate identity information, which can be expressed as vector 114. The vector represents a latent feature representation 114 of the identity information based on an input face 116 of a person. The identity engine 110 can be based on facial recognitions systems, such as FaceNet. The identity engine can generate a high-quality face mapping from the images using deep learning architectures such as ZF-Net and Inception. Then it can use a method called triplet loss as a loss function to train this architecture.

One embodiment of a process for generating a latent feature representation 114 can include a finding the bounding box of the location of faces. Then finding facial features such as length of eyes, length of mouth, the distance between eyes and nose, and so on. The number of facial features chosen may vary, for example, from five to seventy-eight points, depending on annotation. After identifying facial features, the distance between these points is measured. These values are used to classify a face. The faces can be aligned using the facial features. This can be done to align face images displayed from a different angle in a straight-forward orientation. Then the features extracted can be matched with a template. The aligned faces can be used for comparison. The aligned face can then be analyzed to generate an embedding of the face using face clustering. The resultant identification encoding of the face, also referred to as an identification representation, can be output for further use be the face generation system 150. Though not perfect, the identification representation can be invariant to occlusion, pose, lighting and even age, and other factors that would affect perceptive differences between different images of the same person. The latent feature representation 114 is representative of an encoding that provides an identity of a person, which can also be referred to as the identity or identity information of a person. In some embodiments, the latent feature representation 114 can be a 512 value encoding.

Decoder Engine

An autoencoder machine learning model may be used for generating a decoder engine 120. As may be appreciated, an autoencoder can be generated using a supervised machine learning technique capable of learning efficient representations of input data. The decoder engine 120 may represent neural networks, such as dense (e.g., fully connected) neural networks. As described above, the output of the identity engine 110 may be provided to the decoder engine 120 through a shared layer of variables (e.g., hidden variables) which may be referred to as the latent feature representation 114 of the input. As may be appreciated, the output of the identity engine 110 may be obtained via a forward pass of input identity information through layers forming the identity engine 110.

The face generation system 150 may use a trained encoder, such as the identity engine 110 that encodes the identity information into a latent feature representation 114. The encoder may be a universal encoder for translating the input images and video into latent feature space representations. A resulting latent feature representation may be generated which is based on distributions of latent variables. The identity engine 110 can be trained prior to training of the decoder engine 120. The face generation system 150 can train a decoder engine for each authoring engine 130. Each trained decoder engine 120 can then be used to decode a latent feature representation 114 in order to output a face model associated with the identity represented by the latent feature representation 114.

The training process for generating a decoder engine 120 for an authoring engine 130 includes generating synthetic training data 131 by the authoring engine 130. The synthetic training data 131 can be a face model generated by the authoring engine 130. The synthetic training data 131 can include at least two components, 1) the face model including the authoring parameters 124 associated with the generated face model, and 2) an image of the generated face model. The image of the face model is provided to the identity engine 110 to generate a latent feature representation 114 of the face. The goal of training the decoder engine 120 is to generate a face model based on latent feature representation 114 using the authoring parameters 124. The training of the decoder engine 120 generates a mapping of a latent representation (e.g., latent feature representation 114) to another linear model (e.g., the authoring parameters 124 of a linear modeling space for a blendshape-based model) to generate shapes consistent with the domain used for training the autoencoder. In one embodiment, a FaceNet embedding and a target blendshape-based model with linear parametric spaces are used.

In some embodiments, to construct the mapping using machine learning (ML) techniques, random parameters can be generated by the authoring engine 130 and the corresponding synthetic images. Next, a latent feature representation 114 is generated by the identity engine 110 for the generated synthetic images. The data pairs (i.e., the authored face models and corresponding latent feature representation 114) comprise the training data for the corresponding supervised ML problem. A Deep Neural Network (DNN) approach can be used to train the ML model. In one example, a dataset includes 150,000 pairs total with 9:1 split between training and validation datasets. Randomization can be utilized to get a uniform distribution of parameters values. Varying the DNN architectures can reach similar optimal performance across a wide range of possible architectures. In one embodiment, a single fully-connected hidden layer FC (32k) is used to map the latent spaces of interest.

The authoring parameters 124 for the authoring engine 130 are the target output of the decoder engine 120. The decoder engine 120 can be trained for a specific identity engine 110 and a specific authoring engine 130. Advantageously, once a decoder engine 120 is generated, new face models can be generated by the authoring engine 130 by providing latent feature representations 114 generated by the identity engine 110 to the decoder engine 120. For example, the latent feature representation may be generated randomly or pseudo-randomly by the identity engine 110. Once generated, the decoder engine 120 can generate authoring parameters 124 corresponding to the generated identities. These authoring parameters 124 can then be used by the authoring engine 130 to automatically generate synthetic face shapes that are representative of human faces. In this way, the face generation system 150 may generate new face models based on randomly generated identities from an identity engine 110. These expressions may advantageously represent realistic face shapes of people (such as illustrated in FIG. 5B).

Example Block Diagrams Generating Output of Face Model (s)

Generating realistic face shapes for a person for use within an electronic game is of great importance to electronic game designers. For example, generating realistic face shapes for a large group of virtual characters within a game environment, such as in a stadium or on within a city can allow for game designers to generate realistic virtual environments where non-player characters have varying features. As will be described, the techniques described herein may allow for rapid generation of realistic face shapes of that generally match the face shapes of real-life persons. For example, thousands of face shapes of persons within a crowd may be randomly generated by the face generation system 150.

Figure 2:
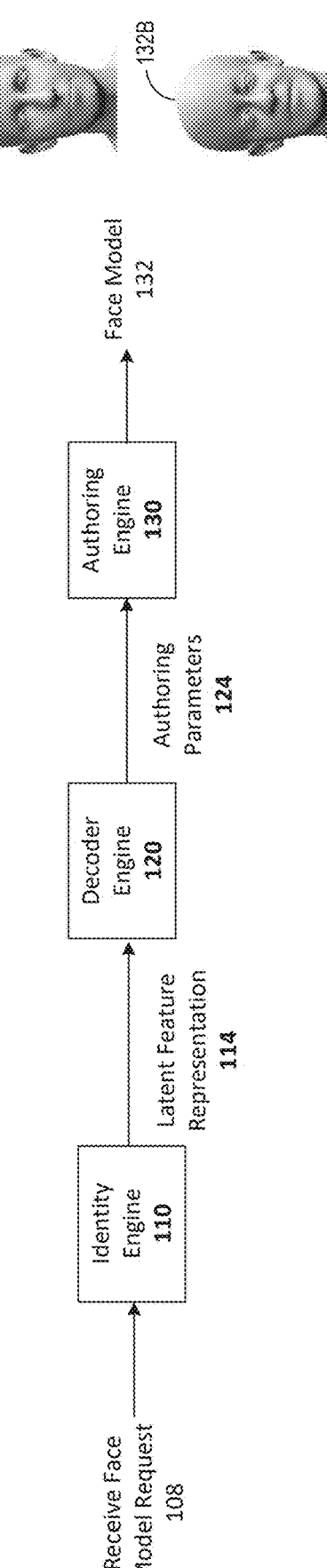
FIG. 2 illustrates a block diagram of a runtime process of a face generation system.

FIG. 2 illustrates a block diagram of components of the face generation system 150. The components can include identity engine 110, decoder engine 120, and authoring engine 130. The identity engine 110 and decoder engine 120 are previously trained models. The identity engine 110 can generate a latent feature representation 114 representing a facial identity and the decoder engine 120 can generate authoring parameters 124 based on the latent feature representation 114. The authoring parameters 124 are specific to the authoring engine 130 and map to blendshapes used for generating face shapes within the authoring engine 130.

The face generation system 150 can receive a request 108 to generate one or more face models. The request 108 can be generated prior to operation of a game application (e.g., game application 104) in order to create face models that are to be pre-loaded into the game application. In such instances, the face generation system 150 may be executed during game development. In some embodiments, the face generation system 150 request may be configured to receive requests during runtime of the game application 104. The request can specify a number of face models to generate. For example, the request may be a request for face models to populate a stadium (e.g., thousands), a city street (e.g., hundreds), or other type of in-game event or location. In some embodiments, the request may include images associated with real-life persons that are to be generated. For example, a user may upload an image and request that a virtual entity is created based on the image.

The identity engine 110 can receive the request and generate a latent feature representation 114 corresponding to each entity requested. The latent feature representation 114 can be pseudo-randomly generated. The pseudo-random generation can be performed in order to select representations within the latent space that represent visually distinct faces. If values are selected within the latent space that are too close, the faces will not be substantially distinguishable. The pseudo-random generation of the latent feature representation 114 can be configured to select the values that are different from each other by a defined threshold or magnitude. The latent feature representations 114 are provided to the decoder engine 120, which can generate authoring parameters 124 for each of the latent feature representations 114. The authoring engine 130 can generate the face models 132 based on the authoring parameters 124. Additionally, the authoring engine 130 can generate other facial characteristics, such as skin textures, eye textures, hair style, facial effects (e.g., car rings, scars, freckles, etc.) that are used to complete a facial model. In this manner, realistic and distinct face models can be automatically generated for use within a game application.

Example Flowcharts for Training and Generation by Face Generation System

Generating realistic face models for a person for use within an electronic game is of great importance to electronic game designers. For example, generating realistic face models may allow for game designers to populate areas within a game application with distinct facial models for the virtual entities rather than reusing a defined set of face models. As will be described, the techniques described herein may allow for training of a model to be used for rapid generation of face models of realistic human faces based on synthetic training data.

Figure 3:
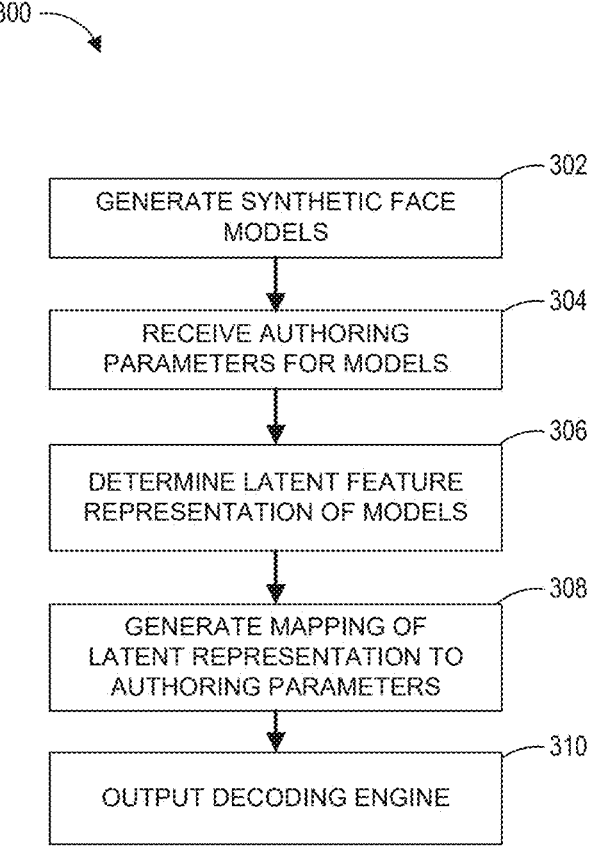
FIG. 3 illustrates an embodiment of a flowchart of an example process for generating a decoding engine for mapping a latent feature space to authoring parameters of an authoring engine.

FIG. 3 is a flowchart of an example process 300 for generating a decoding engine for mapping a latent feature space to authoring parameters of an authoring engine. The process 300 can be implemented by any system that can process data of the authoring engine 130. For example, the process 300, in whole or in part, can be implemented by a game application 104, an interactive computing system 140, face generation system 150, model generation system 160 and/or another system. Although any number of systems, in whole or in part, can implement the process 300, to simplify discussion, the process 300 will be described with respect to particular systems. Further, although embodiments of the process 300 may be performed with respect to variations of systems comprising various game application environments, to simplify discussion, the process 300 will be described with respect to the interactive computing system 140.

At block 302, the system generates synthetic face models of virtual entities. The synthetic training can be generated by an authoring engine. The synthetic training data 131 can be a face model generated by the authoring engine 130. The system can use random parameters generated by the authoring engine 130 and generate corresponding synthetic face models.

At block 304, the system receives authoring parameters for face models. The synthetic training data generated by the authoring engine can include authoring parameters used for generating the face models. The authoring parameters correspond to the parameters used by a parametric facial modeling system to generate the face models.

At block 306, the system determines the latent feature representation of the face models. The latent feature representation 114 can be generated by the identity engine 110 for each of the generated synthetic images. The identity engine may be a universal encoder for translating the input images and video into latent feature space representations. A resulting latent feature representation may be generated which is based on distributions of latent variables. The identity engine can be a pretrained encoder, such as FaceNet, configured to generate a latent feature representation of a defined length, such as a 512 value encoding.

At block 308, the system generates a mapping of the latent feature representation to the authoring parameters. The goal of training the decoder engine 120 is to generate a face model based on latent feature representation 114 using the authoring parameters 124. The training of the decoder engine 120 generates a mapping of a latent representation (e.g., latent feature representation 114) to another linear model (e.g., the authoring parameters 124 of a linear modeling space for a blendshape-based model) to generate shapes consistent with the domain used for training the autoencoder. To construct the mapping using ML techniques, random parameters can be generated by the authoring engine 130 and the corresponding synthetic images. Next, a latent feature representation 114 is generated by the identity engine 110 for the generated synthetic images. The data pairs (i.e., the authored face models and corresponding latent feature representation 114) comprise the training data for the corresponding supervised ML problem. A Deep Neural Network (DNN) approach can be used to train the ML model.

At block 310, the system outputs a decoder engine. The decoder engine is configured to generate authoring parameters 124 for the authoring engine 130 based on latent feature representations. The decoder engine 120 can be trained for a specific identity engine 110 and a specific authoring engine 130. Advantageously, once a decoder engine 120 is generated, new face models can be generated by the authoring engine 130 by providing latent feature representations 114 generated by the identity engine 110 to the decoder engine 120.

Figure 4:
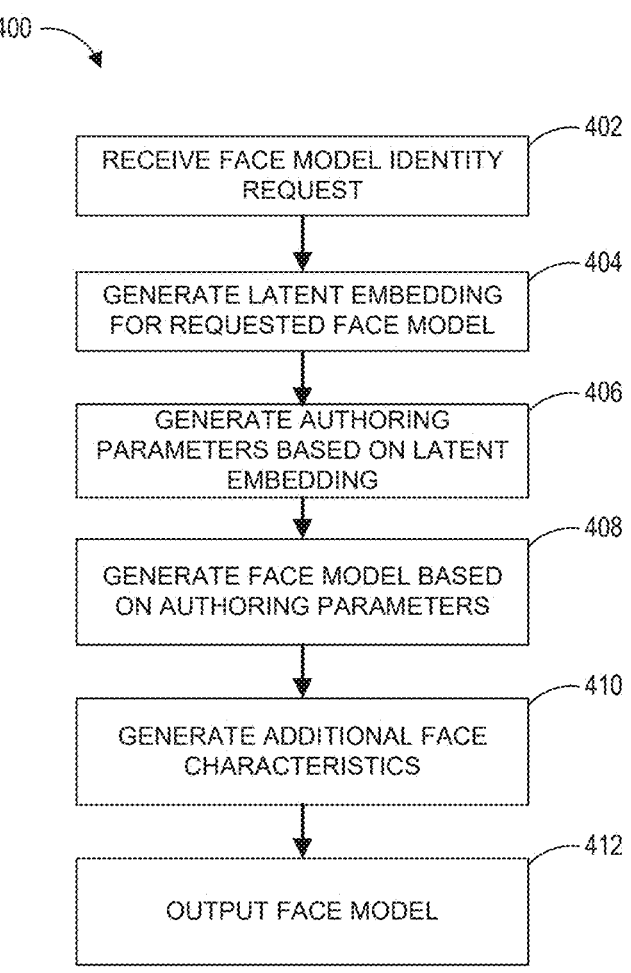
FIG. 4 illustrates an embodiment of a flowchart of an example process for generating face models based on latent feature representations of identities.

FIG. 4 is a flowchart of an example process 400 for generating face models based on latent feature representations of identities. The process 400 can be implemented by any system that can process data and generate face models. For example, the process 400, in whole or in part, can be implemented by a game application 104, an interactive computing system 140, face generation system 150 and/or another system. Although any number of systems, in whole or in part, can implement the process 400, to simplify discussion, the process 400 will be described with respect to particular systems. Further, although embodiments of the process 400 may be performed with respect to variations of systems comprising various game application environments, to simplify discussion, the process 400 will be described with respect to the interactive computing system 140.

At block 402, the system receive a request 108 to generate identities for one or more face models. The request 108 can be generated prior to operation of a game application (e.g., game application 104) in order to create face models that are to be pre-loaded into the game application. In such instances, the face generation system 150 may be executed during game development. In some embodiments, the face generation system 150 request may be configured to receive requests during runtime of the game application 104. The request can specify a number of face identities/models to generate. For example, the request may be a request for face models to populate a stadium (e.g., thousands), a city street (e.g., hundreds), or other type of in-game event or location.

At block 404, the system generates a latent feature representation for each requested face model. The latent feature representation 114 can be pseudo-randomly generated. The pseudo-random generation can be performed in order to select representations within the latent space that represent visually distinct faces. If values are selected within the latent space that are too close, the faces will not be substantially distinguishable. The pseudo-random generation of the latent feature representation 114 can be configured to select the values that are different from each other by a defined threshold or magnitude.

At block 406, the system generates authoring parameters for each of the latent feature representations. The authoring parameters that are generated can be used by a parametric facial modeling system. A parametric facial modeling system can capture a face shape via weights applied to the blendshapes to generate a face model. In some embodiments, the authoring parameters 124 can identity blendshape weights that can be used by an authoring engine 130 to generate a face model 132.

At block 408, the system generates a face model based on the authoring parameters. An authoring engine can generate a face model based on the authoring parameters. The authoring engine can generate a mesh having a face shape defined by the weights of each of the blendshapes of the parametric facial model.

At block 410, the system generates additional face characteristics. The system can additionally be configured to generate other facial characteristics, such as skin textures, eye textures, hair style, facial effects (e.g., car rings, scars, freckles, etc.) that are used to complete a facial model.

At block 412, the system outputs a face model for each of the latent feature representations. The output of the face model can include the mesh, textures, and data associated with generation of the face model by the authoring engine.

Archetype Cluster Mapping

As described herein, parametric representation of the game character heads can be used to automatically generate face models using latent feature representations. This can be used to creating new random characters with parameterized randomization that have realistic face and head shapes. The generation of unconstrained randomization of latent feature representations can produce realistic pseud-random head shapes with correlations coming from the identity engine, such as the FaceNet model, which is trained on millions of human faces. The randomization performed in the latent space without constraints can generate visually distinct realistic faces. However, using a random selection of a latent feature representation can make it difficult to generate face models that have a defined archetype, such as facial characteristics associated with gender, age, ethnicity, profession and/or other archetypes.

The latent feature representations associated with different archetypes can be analyzed to clusters within the latent space. Archetype cluster mapping can be used to determine correlation between parameters associated with different archetypes. The cluster mapping approach can determine the representation of the characteristics within the latent space defined by the respective identity engine, such as FaceNet.

The archetype cluster mapping can be configured to provide a system that allows a user to select one or more archetypes, and generate heads and face shapes specific to particular the particular archetype(s).

Traditionally, generating face models associated with an archetype has been performed by tagging existing assets (like presets within a game application) with specific archetype tags (e.g., African, Asian, Caucasian, etc.). The archetype assets would ensure a consistent look of the generated character. Such an approach provides a narrowly defined range of models that are manually tagged or defined during the development process. Additionally, when working within the latent space, the encodings are not human understandable and a developer cannot manually tag or preset individual values within an encoding to be associated with a specific archetype. Additionally, manually tagging and generating presets can introduce biases and is hard to implement using a modeling system with continuous parameters.

The archetype cluster mapping system overcomes the limitations of the tag-based approach in generating consistent head and face shapes associated with different archetypes using an identity engine, such as FaceNet.

Figure 6A:
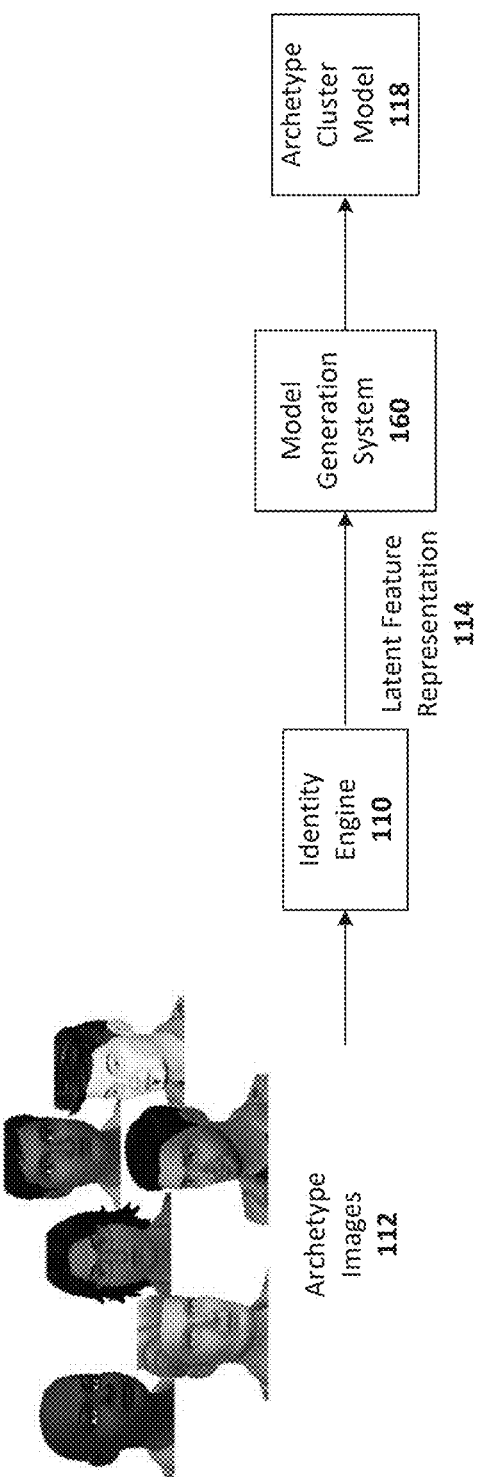
FIG. 6A illustrates a block diagram of a process for generating an archetype cluster model.
Figure 6C:
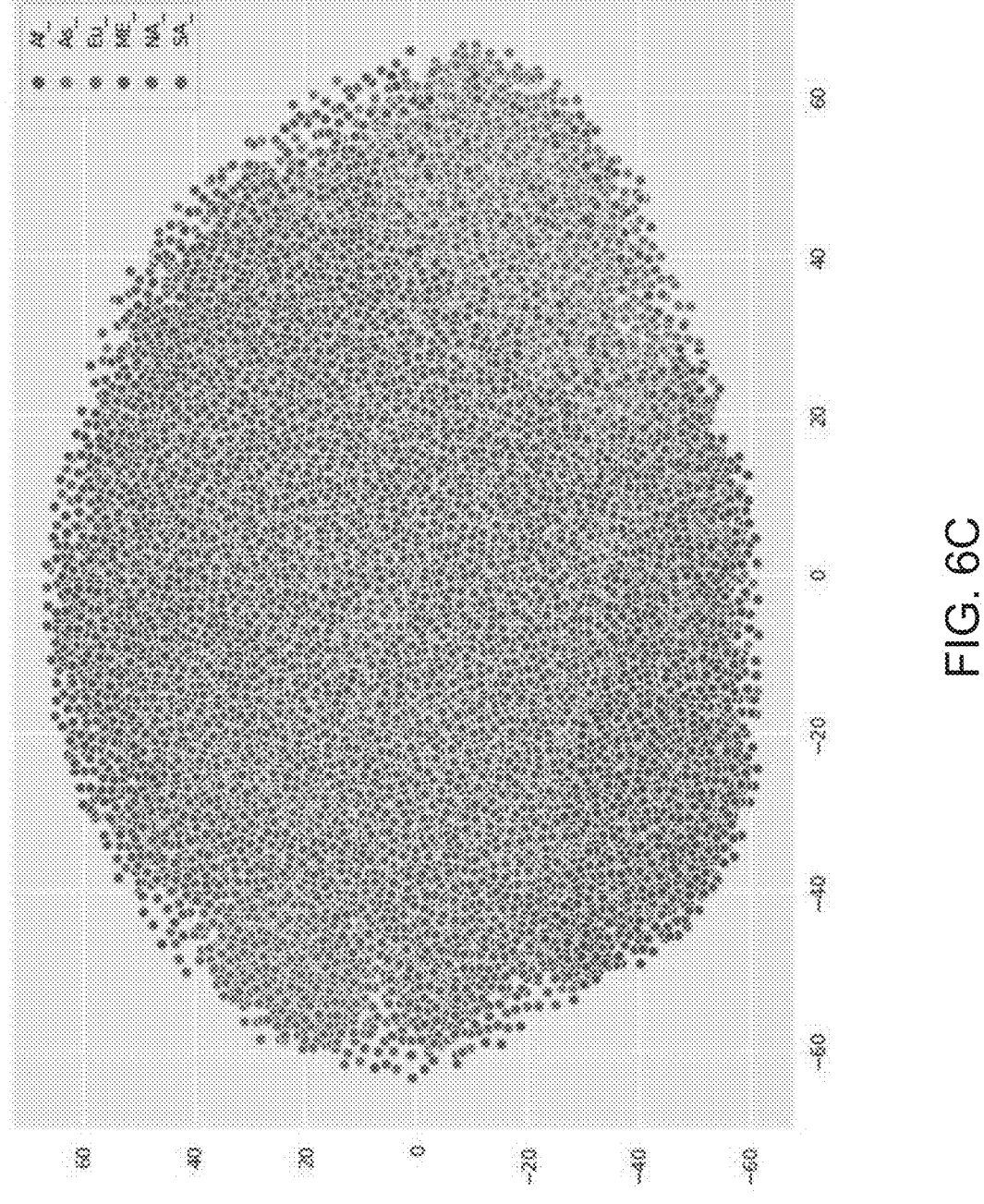
FIG. 6C illustrates an example of clustering of the latent space based on a set of defined archetypes.

FIG. 6A illustrates a block diagram of a process for generating an archetype cluster model 118. The process can use an identity engine 110 and a model generation system 160 to generate an archetype cluster model 118 using machine learning techniques. The archetype cluster model can be configured to determine correlations between parameters within the latent space of an identity engine 110, such as FaceNet. For example, the FaceNet engine generates a 512-dimensional vector for a face. The archetype cluster model 118 can be trained to determine correlations between the parameters of the encoding that are associated with different archetypes. These correlations can be used to cluster the parameters within the latent space, such that defined ranges can be determined that are associated with the different archetypes. For example, FIG. 6C illustrates an example of clustering of the latent space of FaceNet based on a set of defined archetypes. The archetype cluster model 118 can generate clusters for each trained archetype.

The model generation system 160 can use a supervised training technique where each set of training data is associated with a specific archetype. Archetype images 112 can be used that associated with each different class of archetype. The archetype face images that are used for training can be synthetic training data that is generating using generative services, such as an authoring engine 130, text-to-image generative models, with a prompt that can request particular archetype(s) (e.g., age, gender, ethnicity, etc.) of a generated character (such as illustrated in images 612A-C in FIG. 6B). The training data can include real-life images of people from a target archetype. The clustering can improve with larger sets of training data for target archetypes.

The archetype images 112 are provided as input to the identity engine 110, such as FaceNet. The identity engine 110 computes the latent feature representation 114 (e.g., 512-dimensional vector) associated with each training image. The latent feature representation 114 is provided to the model generation system 160 to generate an archetype cluster model 118. The model generation system 160 is configured to determine clusters associated with the archetypally related facial images within the latent space. For example, the model generation system 160 can generate clusters based on similarities between representative facial features of the archetypes. Example characteristics of facial features may include size and shape of nose, checks, eyes, eyebrows, the forehead, cars, mouth, and the like.

The model generation system 160 can generate a representation of each archetype cluster. The representation of an archetype cluster can have a defined range of values such that a face model generated based on values within the defined range of values appears similar to face and head shapes of the defined archetype. The generated archetype cluster model 118 can receive as an input an archetype of a defined list of archetypes. The randomization process can then generate a sample from the corresponding cluster within the latent space of the identity engine. Additionally, the archetype cluster model 118 can be configured so that the generation of multiple random archetype-based latent feature representations are sufficiently different from those in the same cluster to ensure sufficient diversity of facial characteristics within the same archetype cluster.

Example Block Diagrams—Generating Output of Archetype-Based Face Model(s)

Figure 7:
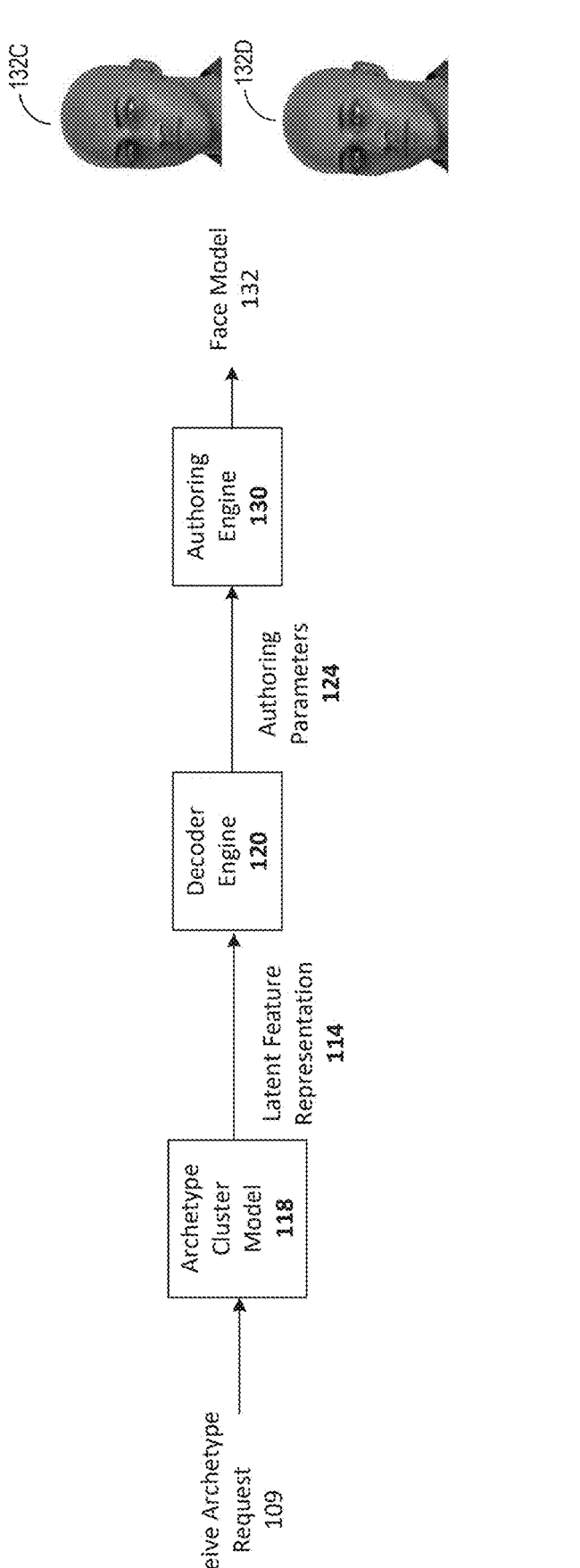
FIG. 7 illustrates a block diagram of a runtime process of a face generation system using an archetype cluster model.

FIG. 7 illustrates a block diagram of components of a variation of the face generation system 150. The components can include archetype cluster model 118, decoder engine 120, and authoring engine 130. The archetype cluster model 118 and decoder engine 120 are previously trained models. The archetype cluster model 118 can generate a latent feature representation 114 representing a facial identity of defined archetypes and the decoder engine 120 can generate authoring parameters 124 based on the latent feature representation 114. The authoring parameters 124 are specific to the authoring engine 130 and map to blendshapes used for generating face shapes within the authoring engine 130.

The face generation system 150 can receive a request to generate one or more face models 109 of a target archetype. The request 109 can be generated prior to operation of a game application (e.g., game application 104) in order to create face models that are to be pre-loaded into the game application. In such instances, the face generation system 150 may be executed during game development. In some embodiments, the face generation system 150 request may be configured to receive requests during runtime of the game application 104. The request can specify a number of face models to generate. The input interface may provide a defined list of target archetypes that can be selected by the user. In some embodiments, multiple archetypes may be selected.

The archetype cluster model 118 can receive the request and identify the cluster associated with the target archetype. The target cluster can include a range defining the target archetype cluster. The archetype cluster model 118 can generate a latent feature representation 114 from within the latent space associated with the archetype cluster. The latent feature representation 114 of the target archetype can be pseudo-randomly generated within the archetype cluster. The pseudo-random generation can be performed in order to select representations within the latent space that represent visually distinct faces. If values are selected within the cluster's latent space that are too close, the faces will not be substantially distinguishable. The pseudo-random generation of the latent feature representation 114 can be configured to select the values that are different from each other by a defined threshold or magnitude. After the archetype-based latent feature representations 114 are generated, they are provided to the decoder engine 120, which can generate authoring parameters 124 for each of the latent feature representations 114. The authoring engine 130 can generate the face models 132 based on the authoring parameters 124. Additionally, the authoring engine 130 can generate other facial characteristics that are appropriate for the selected archetype, such as skin textures, color palette, eye textures, hair style, facial effects (e.g., car rings, scars, freckles, etc.) that are used to complete a facial model. These additional facial characteristics can be tagged with archetype tags so that they can be matched with face models of the appropriate archetype. In this manner, realistic and distinct face models 132 (such as 132C and 132D) can be automatically generated for use within a game application that are associated with one or more selected archetypes.

Example Flowcharts for Training and Generation of Archetype-Based Face Models

Generating realistic archetype-based face models of people within an electronic game is of great importance to electronic game designers. For example, this may allow for game designers to populate areas based on real world locations within a game application with distinct facial models that match the ethnicities of people within the location, such as Europe, Asia, or Africa. Another example is visiting a locations such as schools with many different children, or an environment populated by elderly people. The techniques described herein may allow for training and usage of a model to generate archetype-based face models of realistic human faces.

Figure 8:
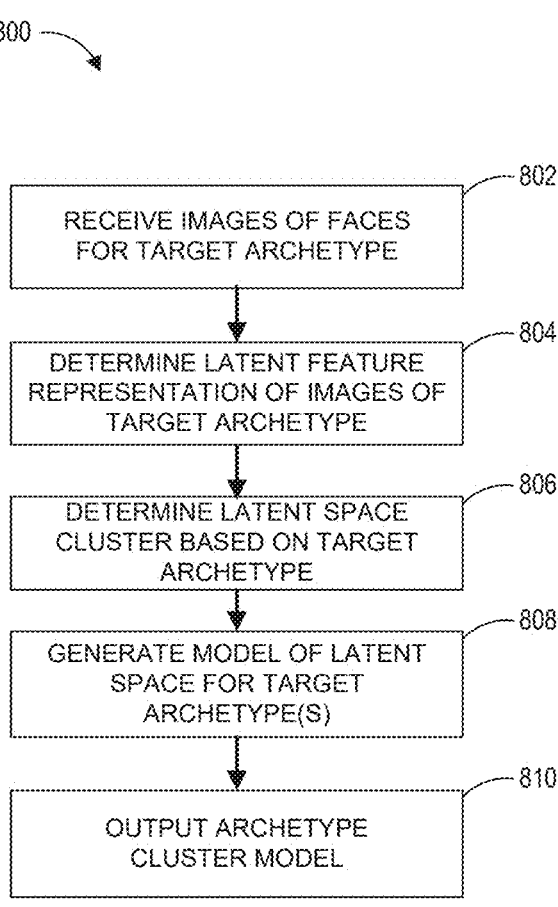
FIG. 8 illustrates a flowchart of an example process for generating an archetype cluster model configured to cluster a latent feature space of an identity engine based on defined archetypes.

FIG. 8 is a flowchart of an example process 800 for generating an archetype cluster model configured to cluster a latent feature space of an identity engine based on defined archetypes. The process 800 can be implemented by a computing system that can process data associated with the latent space of the identity engine 110. For example, the process 800, in whole or in part, can be implemented by an interactive computing system 140, face generation system 150, model generation system 160 and/or another computing system. Although any number of systems, in whole or in part, can implement the process 800, to simplify discussion, the process 800 will be described with respect to particular systems. Further, although embodiments of the process 800 may be performed with respect to variations of systems comprising various computing environments, to simplify discussion, the process 800 will be described with respect to the interactive computing system 140.

At block 802, the system receives images of faces associated with a target archetype. The archetype face images that are used for training can be synthetic training data that is generating using generative services, such as an authoring engine 130, text-to-image generative models, with a prompt that can request particular archetype(s) (e.g., age, gender, ethnicity, etc.) of a generated character (such as illustrated in images 612A-C in FIG. 6B. The training data can include real-life images of people from a target archetype.

At block 804, the system determines a latent feature representation of images of the target archetype. The archetype-based images can be provided as input to an identity engine 110, such as FaceNet. The identity engine may be a universal encoder for translating the input images and video into latent feature space representations. A resulting latent feature representation may be generated which is based on distributions of latent variables. The latent feature representation 114 associated with each training image can be a defined length (e.g., 512-dimensional vector).

At block 806, the system determines latent space clusters based on the latent feature representations of the target archetype. The model generation system can be configured to determine clusters associated with the related facial images of the archetype-based images within the latent space. For example, the model generation system can generate clusters based on similarities between representative facial features of the archetypes. Example characteristics of facial features may include size, shape, and relationships of nose, cheeks, eyes, eyebrows, the forehead, ears, mouth, and the like. The archetype-based clusters are generated within the latent space. A different cluster can be generated for each archetype. In some embodiments, multiple archetypes can be used to generate a cluster, such as profession and age.

At block 808, the system generates a model of the latent space for the target archetype(s). The model generation system can generate a model that determines a representation of each archetype cluster. The representation of an archetype cluster can have a defined range of values such that a face model generated based on values within the defined range of values appears similar to face and head shapes of the defined archetype(s). The model can be generated using ML techniques. A DNN approach can be used to train the ML model.

At block 810, the system outputs an archetype cluster model. The archetype cluster model is configured to generate latent feature representations associated with a selected archetype. The generated archetype cluster model 118 can receive as an input an archetype of a defined list of archetypes. The randomization process can then generate a sample from the corresponding cluster within the latent space of the identity engine. Additionally, the archetype cluster model 118 can be configured so that the generation of multiple random archetype-based latent feature representations are sufficiently different from those in the same cluster to ensure sufficient diversity of facial characteristics within the same archetype cluster.

FIG. 9 is a flowchart of an example process 900 for generating archetype-based face models based on latent feature representations associated with defined archetypes. The process 900 can be implemented by any system that can process data and generate face models. For example, the process 900, in whole or in part, can be implemented by a game application 104, an interactive computing system 140, face generation system 150 and/or another system. Although any number of systems, in whole or in part, can implement the process 900, to simplify discussion, the process 900 will be described with respect to particular systems. Further, although embodiments of the process 900 may be performed with respect to variations of systems comprising various game application environments, to simplify discussion, the process 900 will be described with respect to the interactive computing system 140.

At block 902, the system receive a request 108 to generate identities for one or more face models based on target archetype(s). The request 109 can be generated prior to operation of a game application (e.g., game application 104) in order to create face models that are to be pre-loaded into the game application. In such instances, the face generation system 150 may be executed during game development. In some embodiments, the face generation system 150 request may be configured to receive requests during runtime of the game application 104. The request can specify a number of face models to generate. The input interface may provide a defined list of target archetypes that can be selected by the user. In some embodiments, multiple archetypes may be selected.

At block 904, the system identifies the cluster associated with the target archetype(s). The target cluster can include a range defining the target archetype cluster within the latent space of the identity engine. The target cluster my be associated with a plurality of archetypes, such as gender and ethnicity.

At block 906, the system generates a latent feature representation for each requested identity within the identified cluster. The latent feature representation 114 can be pseudo-randomly generated. The pseudo-random generation can be performed in order to select representations within the latent space that represent visually distinct faces. If values are selected within the latent space that are too close, the faces will not be substantially distinguishable. The pseudo-random generation of the latent feature representation 114 can be configured to select the values that are different from each other by a defined threshold or magnitude.

At block 908, the system generates authoring parameters for each of the latent feature representations. The authoring parameters that are generated can be used by a parametric facial modeling system. A parametric facial modeling system can capture a face shape via weights applied to the blendshapes to generate a face model. In some embodiments, the authoring parameters 124 can identity blendshape weights that can be used by an authoring engine 130 to generate a face model 132.

At block 910, the system generates a face model based on the authoring parameters. An authoring engine can generate a face model based on the authoring parameters. The authoring engine can generate a mesh having a face shape defined by the weights of each of the blendshapes of the parametric facial model.

At block 912, the system generates additional face characteristics. The system can additionally be configured to generate other facial characteristics appropriate for the selected archetype, such as skin textures, color palette, eye textures, hair style, facial effects (e.g., car rings, scars, freckles, etc.) that are used to complete a facial model. These additional facial characteristics can be tagged with archetype tags within the authoring system so that they can be matched with face models of the appropriate archetype.

At block 914, the system outputs a face model for each of the latent feature representations. The output of the face model can include the mesh, textures, and data associated with generation of the face model by the authoring engine.

Computing System

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including range of motion (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in range of motion 46, RAM 48 or storage 40 (which might comprise hard disk, other magnetic storage, optical storage, other non-volatile storage or a combination or variation of these). Part of the program code can be stored in range of motion that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, range of motion 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

The following list has example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method comprising:

receiving a request to automatically generate a first synthetic identity associated with at least one archetype class and a first virtual face model associated with the first synthetic identity;

accessing an archetype cluster model trained based on a plurality of human faces associated with individual archetypes, each human face being defined based on at least one archetype associated with a plurality of facial features, the archetype cluster model trained to identify an archetype cluster of a plurality of archetype clusters within latent space, wherein each archetype cluster is associated with defined ranges of latent feature values within the latent space, and generate a latent feature representation of individual human faces within an identified cluster, wherein the latent feature representation is associated with an identity of the virtual human face;

identifying, using the archetype cluster model, at least one archetype cluster within latent space associated with the at least one archetype class;

generating, using the archetype cluster model, a latent feature representation of the first synthetic identity, wherein the latent feature representation includes latent feature values within the defined ranges of based at least in part on the at least one archetype cluster, wherein the latent feature representation is associated with the first synthetic identity of the first synthetic virtual face;

accessing a decoding engine, the decoding engine trained to reconstruct authoring parameters for an authoring engine based on a latent feature representation of a human face;

generating, using the decoding engine, authoring parameters based at least in part on the latent feature representation of the first synthetic identity; and generating, using the authoring engine, the first virtual face model of a first virtual face based at least in part on the authoring parameters, wherein the virtual face model has the first synthetic identity, wherein the first virtual face model is a mesh model.

2. The computer-implemented method of claim 1, wherein the latent feature representation is pseudo-randomly generated based on the latent space associated with the at least one archetype cluster of the at least one archetype class.

3. The computer-implemented method of claim 2, wherein the request further comprises requests to generate a plurality of virtual face models within at least one archetype class, and the latent feature representation of individual virtual faces is generated for each of the plurality of requested virtual face models.

4. The computer-implemented method of claim 3, wherein a virtual face identity corresponding to each of the plurality of virtual face models is pseudo-randomly generated, and each of the virtual face identities is generated from the latent space associated with the at least one cluster of the at least one archetype class, wherein each latent feature representation is separated from other latent feature representations by a defined threshold value.

5. The computer-implemented method of claim 1 further comprising generating at least one facial characteristic associated with the mesh model of the first virtual face model, wherein the at least one facial characteristic is associated with the at least one archetype class.

6. The computer-implemented method of claim 5, wherein the at least one facial characteristic comprises at least one of skin texture, eye texture, hair mesh, or hair texture.

7. The computer-implemented method of claim 1, wherein the latent feature representation is a vector having a defined set of values.

8. The computer-implemented method of claim 7, wherein each archetype cluster is associated with at least one archetype, and, for each archetype cluster, each value of the set of values of the latent feature representation is associated with a range of values within the latent space.

9. The computer-implemented method of claim 1, wherein the first virtual face model is generated based on weights associated with a plurality of blendshapes that the define a shape of the mesh model.

10. The computer-implemented method of claim 9, wherein the authoring parameters define weights associated with the plurality of blendshapes.

11. The computer-implemented method of claim 1, wherein the archetype cluster model is a machine learning model generated using a deep neural network.

12. Non-transitory computer storage media storing instructions that when executed by a system of one or more computers, cause the one or more computers to perform operations comprising:

receiving a request to automatically generate a first synthetic identity associated with at least one archetype class and a first virtual face model associated with the first synthetic identity;

accessing an archetype cluster model trained based on a plurality of human faces associated with individual archetypes, each human face being defined based on at least one archetype associated with a plurality of facial features, the archetype cluster model trained to identify an archetype cluster of a plurality of archetype clusters within latent space, wherein each archetype cluster is associated with defined ranges of latent feature values within the latent space, and generate a latent feature representation of individual human faces within an identified cluster, wherein the latent feature representation is associated with an identity of the virtual human face;

identifying, using the archetype cluster model, at least one archetype cluster within latent space associated with the at least one archetype class;

generating, using the archetype cluster model, a latent feature representation of the first synthetic identity, wherein the latent feature representation includes latent feature values within the defined ranges of the at least one archetype cluster, wherein the latent feature representation is associated with the first synthetic identity of the first synthetic virtual face;

accessing a decoding engine, the decoding engine trained to reconstruct authoring parameters for an authoring engine based on a latent feature representation of a human face;

generating, using the decoding engine, authoring parameters based at least in part on the latent feature representation of the first synthetic identity; and generating, using the authoring engine, the first virtual face model of a first virtual face based at least in part on the authoring parameters, wherein the virtual face model has the first synthetic identity, wherein the virtual face model is a mesh model.

13. The non-transitory computer storage media of claim 12, wherein the latent feature representation is pseudo-randomly generated based on the latent space associated with the at least one archetype cluster of the at least one archetype class.

14. The non-transitory computer storage media of claim 13, wherein the request further comprises requests to generate a plurality of virtual face models within at least one archetype class, and the latent feature representation of individual virtual faces is generated for each of the plurality of requested virtual face models.

15. The non-transitory computer storage media of claim 14, wherein a virtual face identity corresponding to each of the plurality of virtual face models is generated from the latent space associated with the at least one cluster of the at least one archetype class, wherein each latent feature representation is separated from other latent feature representations by a defined threshold value.

16. The non-transitory computer storage media of claim 12 further comprising generating at least one facial characteristic associated with the mesh model of the first virtual face model, wherein the at least one facial characteristic is associated with the at least one archetype class.

17. The non-transitory computer storage media of claim 16, wherein the at least one facial characteristic comprises at least one of skin texture, eye texture, hair mesh, or hair texture.

18. The non-transitory computer storage media of claim 12, wherein the latent feature representation is a vector having a defined set of values.

19. The non-transitory computer storage media of claim 18, wherein each archetype cluster is associated with at least one archetype, and, for each archetype cluster, each value of the set of values of the latent feature representation is associated with a range of values within the latent space.

20. A system comprising one or more computers and non-transitory computer storage media storing instructions that when executed by the one or more computers, cause the one or more computers to perform operations comprising:

receiving a request to automatically generate a first synthetic identity associated with at least one archetype class and a first virtual face model associated with the first synthetic identity;

accessing an archetype cluster model trained based on a plurality of human faces associated with individual archetypes, each human face being defined based on at least one archetype associated with a plurality of facial features, the archetype cluster model trained to identify an archetype cluster of a plurality of archetype clusters within latent space, wherein each archetype cluster is associated with defined ranges of latent feature values within the latent space, and generate a latent feature representation of individual human faces within an identified cluster, wherein the latent feature representation is associated with an identity of the virtual human face;

identifying, using the archetype cluster model, at least one archetype cluster within latent space associated with the at least one archetype class;

generating, using the archetype cluster model, a latent feature representation of the first synthetic identity, wherein the latent feature representation includes latent feature values within the defined ranges of the at least one archetype cluster, wherein the latent feature representation is associated with the first synthetic identity of the first synthetic virtual face;

accessing a decoding engine, the decoding engine trained to reconstruct authoring parameters for an authoring engine based on a latent feature representation of a human face;

generating, using the decoding engine, authoring parameters based at least in part on the latent feature representation of the first synthetic identity; and generating, using the authoring engine, the first virtual face model of a first virtual face based at least in part on the authoring parameters, wherein the virtual face model has the first synthetic identity, wherein the virtual face model is mesh model.

* * * * *